US011836172B2

(12) United States Patent
Du et al.

(10) Patent No.: US 11,836,172 B2
(45) Date of Patent: Dec. 5, 2023

(54) FACILITATING GENERATION OF DATA VISUALIZATIONS VIA NATURAL LANGUAGE PROCESSING

(71) Applicant: ADOBE INC., San Jose, CA (US)

(72) Inventors: Fan Du, Milpitas, CA (US); Zening Qu, Seattle, WA (US); Vasanthi Swaminathan Holtcamp, Fremont, CA (US); Tak Yeon Lee, San Jose, CA (US); Sungchul Kim, San Jose, CA (US); Saurabh Mahapatra, Sunnyvale, CA (US); Sana Malik Lee, Cupertino, CA (US); Ryan A. Rossi, Santa Clara, CA (US); Nikhil Belsare, Foster City, CA (US); Eunyee Koh, San Jose, CA (US); Andrew Thomson, Concord, CA (US); Sumit Shekhar, Karnataka (IN)

(73) Assignee: Adobe Inc., San Jose, CA (US)

( * ) Notice: Subject to any disclaimer, the term of this patent is extended or adjusted under 35 U.S.C. 154(b) by 154 days.

(21) Appl. No.: 17/354,954

(22) Filed: Jun. 22, 2021

(65) Prior Publication Data
US 2022/0405314 A1    Dec. 22, 2022

(51) Int. Cl.
*G06F 16/33* (2019.01)
*G06N 5/046* (2023.01)
*G06F 16/338* (2019.01)

(52) U.S. Cl.
CPC ........ *G06F 16/3344* (2019.01); *G06F 16/338* (2019.01); *G06F 16/3346* (2019.01); *G06N 5/046* (2013.01)

(58) Field of Classification Search
CPC .............. G06F 16/3344; G06F 16/338; G06F 16/3346; G06N 5/046
See application file for complete search history.

(56) References Cited

U.S. PATENT DOCUMENTS

| | | | |
|---|---|---|---|
| 2019/0034500 A1* | 1/2019 | Das | G06F 16/248 |
| 2020/0394360 A1* | 12/2020 | Dunn | G06N 3/08 |
| 2021/0256224 A1* | 8/2021 | Tory | G06F 40/20 |

OTHER PUBLICATIONS

Lee, Doris Jung-Lin. "Insight Machines: The Past, Present, and Future of Visualization Recommendation." Medium, Feb. 2020.

(Continued)

*Primary Examiner* — Mark D Featherstone
*Assistant Examiner* — Ranjit P Doraiswamy
(74) *Attorney, Agent, or Firm* — Shook, Hardy & Bacon L.L.P.

(57) ABSTRACT

Methods, computer systems, computer-storage media, and graphical user interfaces are provided for facilitating data visualization generation. In one implementation, dataset intent data, visual design intent data, and insight intent data determined from a user input natural language query are obtained. A set of candidate intent recommendations is generated using various combinations of the dataset intent data, visual design intent data, and insight intent data. Each of the candidate intent recommendations is incorporated into a set of visualization templates to determine eligibility of the candidate intent recommendations. For eligible candidate intent recommendations, a score associated with a corresponding visualization template is determined. Based on the scores, a candidate intent recommendation and corresponding visualizations template is selected to use as a visual recommendation for presenting a data visualization.

20 Claims, 10 Drawing Sheets

(56) References Cited

OTHER PUBLICATIONS

Demiralp, Çağatay, et al. "Foresight: Recommending visual insights." arXiv preprint arXiv:1707.03877 (2017).

Chan, Gromit Yeuk-Yin, et al. "Real-Time Clustering for Large Sparse Online Visitor Data." Proceedings of The Web Conference 2020. 2020.

Wongsuphasawat, Kanit, et al. "Voyager 2: Augmenting visual analysis with partial view specifications." Proceedings of the 2017 CHI Conference on Human Factors in Computing Systems. 2017.

Wongsuphasawat, Kanit, et al. "Voyager: Exploratory analysis via faceted browsing of visualization recommendations." IEEE transactions on visualization and computer graphics 22.1 (2015): 649-658.

Vartak, Manasi, et al. "Seedb: Efficient data-driven visualization recommendations to support visual analytics." Proceedings of the VLDB Endowment International Conference on Very Large Data Bases. vol. 8. No. 13. NIH Public Access, 2015.

Hu, Kevin, et al. "Vizml: A machine learning approach to visualization recommendation." Proceedings of the 2019 CHI Conference on Human Factors in Computing Systems. 2019.

Moritz, Dominik, et al. "Formalizing visualization design knowledge as constraints: Actionable and extensible models in draco." IEEE transactions on visualization and computer graphics 25.1 (2018): 438-448.

Mackinlay, Jock, Pat Hanrahan, and Chris Stolte. "Show me: Automatic presentation for visual analysis." IEEE transactions on visualization and computer graphics 13.6 (2007): 1137-1144.

Wu, Tongshuang, et al. "Tempura: Query Analysis with Structural Templates." Proceedings of the 2020 CHI Conference on Human Factors in Computing Systems. 2020.

Yu, Bowen, and Cláudio T. Silva. "Flowsense: A natural language interface for visual data exploration within a dataflow system." IEEE transactions on visualization and computer graphics 26.1 (2019): 1-11.

Gao, Tong, et al. "Datatone: Managing ambiguity in natural language interfaces for data visualization." Proceedings of the 28th Annual ACM Symposium on User Interface Software & Technology 2015.

\* cited by examiner

| Data Intent | Example Query |
|---|---|
| Select data table — 310 | "covid" |
| Select data field | "death cases" |
| Exclude data field | "never show death cases" |
| Bin data field | "make 10 bins" |
| Exclude null values | "exclude null" |
| Compute derived value | "total cases in the U.S.", "death cases / population" |

302

| Design Intent | Example Query |
|---|---|
| Chart type | "map" |
| Chart name | "waffle chart" |
| Coordinate system | "polar" |
| Projection | "mercator projection" |
| Style | "Tufte style" |
| Style customization | "adjust to dark background" |
| Size customization | "make wider" |
| Mark customization | "show in areas" |
| Axis customization | "include 0 on x axis" |
| Encoding customization | "in pink and blue colors" |
| Legend customization | "make legend horizontal" |
| Highlight | "select top 5%" |
| Annotate | "write 'these are top 5%'" |
| Interactivity | "add a dropdown menu" |
| Animated transitions | "morph from bar chart to donut chart" |
| Layout | "side by side" |

304

| Insight Intent | Example Query |
|---|---|
| Retrieve value | "how many new cases in King County, Seattle today?" |
| Find extremum | "county with highest cases" |
| Filter data values | "find CA counties where death cases > 0" |
| Sort | "order by cases" |
| Determine range | "what dates are recorded?" |
| Characterize distribution | "how does covid cases look like across the country?" |
| Find anomalies | "any outliers?" |
| Cluster | "states with similar growth rates" |
| Correlate | "what correlates with covid cases?" |

FACILITATING GENERATION OF DATA VISUALIZATIONS VIA NATURAL LANGUAGE PROCESSING

BACKGROUND

Data visualizations can provide a powerful way to convey information. In particular, visualizing data in a meaningful or compelling way can be influential and facilitate decisions making. Many existing data analytics and visualization tools are sophisticated. Creating a meaningful, or compelling, data visualization using such visualization tools, however, can be difficult and tedious. For example, many data consumers have limited experience with data science and/or graphical designs making generation of data visualizations difficult. Further, an extensive amount of data and data visualizations can make it time consuming to identify specific data and an appropriate manner in which to present the data. Accordingly, although such existing data analytics and visualization tools are powerful, they may be difficult and inefficient for many data consumers to use.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating automated generation of visual designs and insights via natural language processing. In this regard, a user may provide or input a natural language query and, based on the input, obtain an automatically generated data visualization. A user only needs a high-level idea or understanding about the data, design, and/or insights desired. Accordingly, the user need not have a strong understanding of the data or the visualization technologies in order to generate a meaningful visual design.

At a high level, implementations described herein employ natural language processing and recommendation functionality to facilitate creation of data visualizations. In particular, a user may simply input ideas or thoughts (e.g., via a verbal or written input). Based on the input, the recommendation functionality can generate candidates or recommendations of data, design, and/or insights for generating a data visualization. In this regard, implementations described herein use intent recognition techniques to infer a user's interests from ambiguous or partial queries. Further, intents not identified via the user input can be determined and recommended to supplement the intents indicated in the user input.

BRIEF DESCRIPTION OF THE DRAWINGS

The technology described herein is described in detail below with reference to the attached drawing figures, wherein:

FIG. 3 provides example intent tables, in accordance with aspects of the technology described herein;

DETAILED DESCRIPTION

Figure 1:
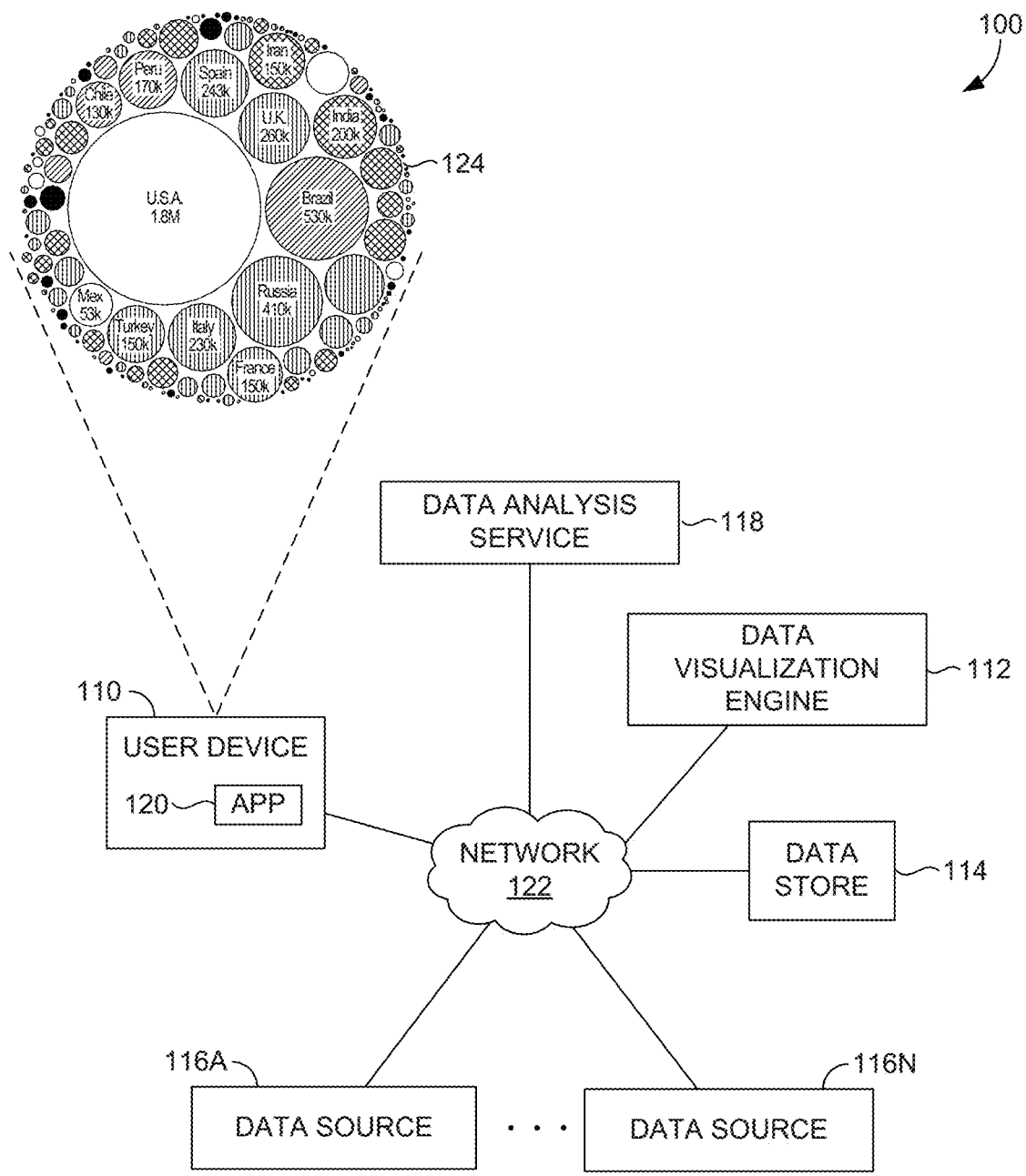
FIG. 1 is a block diagram of an exemplary system for facilitating generation of data visualizations, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

As data is becoming increasingly pervasive and plentiful, many individuals seek to use such data to provide meaningful data visualizations to others. Individuals oftentimes have unique perspectives and ideas on how to generate a meaningful visualization, or otherwise provide a story from data. Visualizing data in a meaningful or compelling way can be influential and facilitate decisions making.

Many existing data analytics and visualization tools are sophisticated. Creating a meaningful, or compelling, data visualization using such visualization tools, however, can be difficult. For example, many data consumers have limited experience with data science and/or graphical designs. Accordingly, although such existing data analytics and visualization tools are powerful, they may be difficult and inefficient for many data consumers to use.

Such difficulties and inefficiencies may transpire at many steps in the data visualization workflow, including exploring data, identifying insights, and generating and customizing designs. By way of example, with regard to exploring data, users often have only high-level ideas of the desired information. However, conventional data visualization authoring tools require users to specify data fields for use in generating charts. It may be difficult for many users to map their high-level ideas to specific data fields. With regard to finding insights, statistical insights such as distributions, outliers, and correlations are one approach that users may use to drive data exploration and tell compelling stores. However, without data science knowledge and programming skills, it may be difficult for users to discover data insights. With regard to customizing charts, users often have evolving design needs. Initially, a user may desire to view a line chart. Subsequently, the user may desire to add filters and change colors. Existing tools require users to translate their high-level design concepts like "line chart" or "add a filter" to manual user interface actions, such as selecting button, selecting from a menu, etc. As another example, a strong chart title, highlighting, and annotations facilitate understanding a visualization. Adding highlighting and annotations is a tedious task, particularly when there are a lot of marks. For instance, using a mouse to select a particular line to highlight among numerous lines (e.g., 50+) may be difficult. Users, however, often do not have the expertise or time to learn sophisticated user interface tools.

Accordingly, manual visualization authoring tools that utilize a manual workflow for data exploration and visualization can be difficult and time consuming. As described, an analyst may need to select which variables to explore, decide what kind of visualization charts to use, inspect if useful insights exist, and repeat. Such tools may be too tedious for non-experts who have limited data science knowledge or graphic design skills.

Further, conventional automated analytics tools can also be tedious and difficult for non-experts. Conventional automated analytics tools may select interesting data variables or generate appropriate visual representations. For example, one such tool can automatically recommend chart types based on users' variable selections. Although such automated analytics tools can provide helpful guidance, they lack an input channel for users to communicate their intents so as to get desired results quickly. Further, any inputs require the users to be familiar with the data and specify concrete data queries, such as "Show me a barchart of sum of order total value by geo cities." However, non-expert users often only have vague ideas or questions, such as "How is the revenue?" It may be difficult for non-expert users to map their ideas to the concrete queries.

As such, embodiments described herein facilitates automated generation of visual designs and insights via natural language processing. In this regard, a user may provide or input a natural language query and, based on the input, obtain an automatically generated data visualization. As such, a user only needs a high-level idea or understanding about the data, design, and/or insights desired. Accordingly, the user need not have a strong understanding of the data or the visualization technologies in order to generate a meaningful visual design.

At a high level, implementations described herein employ natural language processing and recommendation functionality to facilitate creation of data visualizations. In particular, a user may simply input ideas or thoughts (e.g., via a verbal or written input). Based on the input, the recommendation functionality can generates candidates or recommendations of data, design, and/or insights for generating a data visualization. In this regard, implementations described herein use intent recognition techniques to infer a user's interests from ambiguous or partial queries. Further, intents not identified via the user input can be determined and recommended to supplement the intents indicated in the user input.

Advantageously, embodiments described herein facilitate efficient generation of data visualizations. In particular, the technology described herein enables usage of reduced amount of resources as it more specifically analyzes aspects of interest to a user (e.g., input via a natural language input). Importantly, it does so without reducing the effectiveness or breadth of possible areas of interest not specifically identified via a natural language input. For example, for aspects not specified via a natural language input, embodiments described herein identify and recommend data, design, and/ or insight related aspects for analyzing to identify a data visualization to recommend. In this way, a user may be presented with a data visualization that targets desired aspects specifically stated by the user and also aspects not explicitly stated by the user. Further, an intent table(s) used to identify intents associated with a natural language query can be predetermined, thereby resulting in more efficient data processing upon obtaining the natural language query. In this regard, in accordance with obtaining a dataset and/or a set of visualization templates, the dataset and/or visualization templates can be automatically analyzed to identify various intents that may be associated therewith. As such, intent tables including such various intents may be generated in advance and used at runtime to identify a visual recommendation(s) to provide to a user.

Overview of Exemplary Environments for Facilitating Visual Design and Insights

Referring initially to FIG. 1, a block diagram of an exemplary network environment 100 suitable for use in implementing embodiments described herein is shown. Generally, the system 100 illustrates an environment suitable for facilitating visual design and insights via natural language processing. Among other things, embodiments described herein effectively and efficiently generate data visualizations in accordance with natural language queries provided by a user. In this regard, a user can input or provide a high-level idea and, based on the input, be automatically provided with a corresponding data visualization. A data visualization generally refers to any visualization of data that can illustrate data and insights associated therewith. For example, data visualizations may include charts, graphs, and insights corresponding therewith. Such data visualizations may be used to present a story or visual regarding a topic.

The network environment 100 includes a user device 110, a data visualization engine 112, a data store 114, data sources 116a-116n (referred to generally as data source(s) 116), and a data analysis service 118. The user device 110, the data visualization engine 112, the data store 114, the data sources 116a-116n, and the data analysis service 118 can communicate through a network 122, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the exemplary network environment 100 be interpreted as having any dependency or requirement related to any single component or combination of components illustrated therein. For example, the user device 110 and data sources 116a-116n may be in communication with the data visualization engine 112 via a mobile network or the Internet, and the data visualization engine 112 may be in communication with data store 114 via a local area network. Further, although the environment 100 is illustrated with a network, one or more of the components may directly communicate with one another, for example, via HDMI (high-definition multimedia interface), and DVI (digital visual interface). Alternatively, one or more components may be integrated with one another, for example, at least a portion of the data visualization engine 112 and/or data store 114 may be integrated with the user device 110 and/or data analysis service 118. For instance, a portion of the data visualization engine 112 may be integrated with a server (e.g., data analysis service) in communication with a user device, while another portion of the data visualization engine 112 may be integrated with the user device (e.g., via application 120).

The user device 110 can be any kind of computing device capable of facilitating visual designs and insights via natural language processing. For example, in an embodiment, the user device 110 can be a computing device such as computing device 900, as described above with reference to FIG. 9. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating visual designs and insights via natural language processing. In some implementations, the application(s) comprises a web application, which can run in a web browser, and could be hosted at least partially server-side (e.g., via data visualization engine 112 or data analysis service 118). In addition, or instead, the application(s) can comprise a dedicated application. In some cases, the application is integrated into the operating system (e.g., as a service). As one specific example application, application 120 may be a visual design tool or other data analysis tool that provides various data and data visualizations. Such an application may be accessed via a mobile application, a web application, or the like.

User device 110 can be a client device on a client-side of operating environment 100, while data visualization engine 112 and/or data analysis service 118 can be on a server-side of operating environment 100. Data visualization engine 112 and/or data analysis service 118 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted there is no requirement for each implementation that any combination of user device 110, data visualization engine 112, and/or data analysis service 118 to remain as separate entities.

In an embodiment, the user device 110 is separate and distinct from the data visualization engine 112, the data store 114, the data sources 116, and the data analysis service 118 illustrated in FIG. 1. In another embodiment, the user device 110 is integrated with one or more illustrated components. For instance, the user device 110 may incorporate functionality described in relation to the data visualization engine 112. For clarity of explanation, embodiments are described herein in which the user device 110, the data visualization engine 112, the data store 114, the data sources 116, and the data analysis service 118 are separate, while understanding that this may not be the case in various configurations contemplated.

As described, a user device, such as user device 110, can facilitate data visualization via natural language processing. Data visualization is broadly used herein and may refer to any visual designs and/or insights associated with a dataset(s).

A user device 110, as described herein, is generally operated by an individual or entity interested in viewing visualizations of data (e.g., in the form of graphs, charts, insights, etc.). As can be appreciated, a user interested in viewing data visualizations need not be an individual or entity associated with capturing or providing a dataset from which the data visualizations are generated. For example, in some cases, a user desiring to view data visualizations may be an individual gathering insights of trends of data provided by another entity (e.g., in a collaborative environment or obtained via the Internet).

In some cases, automated data visualization may be initiated at the user device 110. For example, a user may input or provide a natural language query. A natural language query generally refers to any query having natural language. In this regard, a user can speak or type at will to provide aspects of a desired data visualization. Various aspects a user may indicate as desired may include, dataset attributes, design attributes, and insight attributes. Dataset attributes refer to attributes related to the data. Design attributes refer to attributes related to a visualization design. Insight attributes refer to attributes related to insights.

As can be appreciated, in some cases, a user of the user device 110 that may initiate data visualization is a user that can view the visualization data. In additional or alternative cases, an administrator, programmer, or other individual associated with an organization may initiate data visualization, but not necessarily be a consumer or viewer of the data visualization.

A natural language query or input may be provided via an application 120 operating on the user device 110. In this regard, the user device 110, via an application 120, might allow a user to input, select, or otherwise provide a natural language query. The application 120 may facilitate inputting of a natural language query in a verbal form of communication or a textual form of communication. The user device 110 can include any type of application and may be a stand-alone application, a mobile application, a web application, or the like. In some cases, the functionality described herein may be integrated directly with an application or may be an add-on, or plug-in, to an application.

Such a natural language query may be input at the user device 110 in any manner. For instance, upon accessing a particular application (e.g., a data analytics application), a user may be presented with, or navigate to, a text input tool to input a query. As another example, a user may select an icon to initiate input via a voice query. Irrespective of a type of input, a user may provide various aspects including dataset attributes, design attributes, and/or insight attributes.

The user device 110 can communicate with the data visualization engine 112 to provide natural language queries, initiate generation of data visualizations, and/or obtain data visualizations, or recommendations associated therewith. In embodiments, for example, a user may utilize the user device 110 to initiate a generation of a data visualization via the network 122. For instance, in some embodiments, the network 122 might be the Internet, and the user device 110 interacts with the data visualization engine 112 (e.g., directly or via data analysis service 118) to initiate generation of a data visualization. In other embodiments, for example, the network 122 might be an enterprise network associated with an organization. It should be apparent to those having skill in the relevant arts that any number of other implementation scenarios may be possible as well.

With continued reference to FIG. 1, the data visualization engine 112 can be implemented as server systems, program modules, virtual machines, components of a server or servers, networks, and the like. At a high level, the data visualization engine 112 manages data visualization generation. In particular, the data visualization 112 can obtain a natural language query, or portion thereof, such as a natural language query from user devices 110, and visualization data, such as visualization data from data sources 116. Data sources 116a-116n may be any type of source providing data (e.g., visualization data). Generally, the data visualization engine 112 can receive natural language queries and/or visualization data from any number of devices. As such, the data visualization engine 112 can identify and/or collect data from various user devices, such as user device 110, and sources, such as data sources 116a-116n. In this regard, the data visualization engine 112 can retrieve or receive data collected or identified at various components, or sensors associated therewith.

As described, in some cases, the data visualization engine 112 can receive natural language queries for generating data visualizations via the user device 110 (or other device). Natural language queries received from a device, such as user device 110, can include various attributes (e.g., data attributes, design attributes, and/or insight attributes) manually or explicitly input by the user (input queries or selections). Generally, the data visualization engine 112 can receive natural language queries from any number of devices. In accordance with receiving a natural language query (e.g., via the user device 110), the data visualization engine 112 can access and utilize visualization data to generate a data visualization(s). As described, in various embodiments, a user-provided attribute(s) is not required. For example, default attributes (e.g., a default or identified dataset attribute, design attribute, and/or insight attribute) can be used to generate a data visualization(s). As another example, candidate attributes can be identified and analyzed for use in generating a data visualization.

In accordance with a natural language query, the data visualization engine 112 can use visualization data to generate a data visualization. Visualization data generally refers to any data that can be used to generate a data visualization. By way of example only, visualization data may include a dataset from which a data visualization is generated, a visualization template from which a data visualization is generated, and/or a preconfigured data table from which a data visualization is generated. A dataset used for forming a data visualization can be any type of data. By way of example and not limitation, data within a dataset may include data that is sensed or determined from one or more sensors, such as location information of mobile device(s), smartphone data (such as phone state, charging data, date/time, or other information derived from a smartphone), activity information (for example: app usage; online activity; searches; browsing certain types of webpages; listening to music; taking pictures; voice data such as automatic speech recognition; activity logs; communications data including calls, texts, instant messages, and emails; website posts; other user data associated with communication events) including user activity that occurs over more than one device, user history, session logs, application data, contacts data, calendar and schedule data, notification data, social network data, news (including popular or trending items on search engines or social networks), online gaming data, ecommerce activity, sports data, health data, and nearly any other source of data that may be used to generate data visualizations as described herein.

Visualization template data may include any data associated with a visualization template. Such data may include source code or metadata indicating various aspects of data associated with the template.

Intent table data may include any data associated with an intent table. An intent table can include a set of intents, such as dataset intents, visual design intents, and insight intents. As described herein, intent table data may be determined in association with a dataset(s) and/or visualization template(s). For example, by analyzing a dataset and a set of visualization templates, a set of potential intents can be determined and included in the intent table.

Such visualization data can be initially collected at remote locations or systems and transmitted to data store 114 for access by data visualization engine 112. In accordance with embodiments described herein, visualization data collection may occur at data sources 116. In some cases, data sources 116, or portion thereof, may be user devices, that is, computing devices operated by a user. As such, user devices, or components associated therewith, can be used to collect various types of visualization data. For example, in some embodiments, visualization data may be obtained and collected at a user device via one or more sensors, which may be on or associated with one or more user devices and/or other computing devices. As used herein, a sensor may include a function, routine, component, or combination thereof for sensing, detecting, or otherwise obtaining information, such as visualization data, and may be embodied as hardware, software, or both.

In addition or in the alternative to data sources 116 including user devices, data sources 116 may include servers, data stores, or other components that collect visualization data, for example, from user devices. For example, in interacting with a user device, datasets may be captured at data sources 116 and, thereafter, such visualization data can be provided to the data store 114 and/or data visualization engine 112. In this regard, dataset contributors may operate a client device and provide a dataset to the data source 116. As another example, visualization templates may be generated by a template contribute and provided to the data source 116. Although generally discussed as visualization data provided to the data store 114 and/or data visualization engine 112 via data sources 116 (e.g., a user device or server, data store, or other component in communication with user device), visualization data may additionally or alternatively be obtained at and provided from the data analysis service 118, or other external server, for example, that collects visualization data. Visualization data can be obtained at a data source periodically or in an ongoing manner (or at any time) and provided to the data store 114 and/or data visualization engine 112 to facilitate generation of data visualizations.

In accordance with embodiments described herein, and as more fully described below with reference to FIG. 2, the data visualization engine 112 may analyze a natural language query to identify candidate intent sets associated therewith. A candidate intent set may include an intent keyword and an intent attribute(s). Such candidate intent sets can be input into a set of intent inference models to determine intents, and probabilities associated therewith. In embodiments, an intent or intent attribute may be recommended or identified to replace a missing or default intent. Candidate intent recommendations may be generated that include different combinations of candidate dataset data, candidate visual design data, and candidate insight data. A score can be generated for the candidate intent recommendations using weights in association with each of the different intents. Such weights may include intent probabilities and/or popularity probabilities. Such scores can then be used to recommend a data visualization for presenting to a user.

In some cases, the recommended data visualization can be provided to the user device 110 for display to the user. In other cases, the data analysis service 118 may use such data to perform further analysis and/or render or provide data visualizations to the user device 110. In some embodiments, the data analysis service 118 can reference a data visualization recommendation indicating dataset data, visual design data, candidate data and a visualization template and use such data to perform generate a data visualization and/or provide the data visualization to the user device 110. The data analysis service 118 may be any type of server or service that can analyze data, render data, and/or provide information to user devices. Although data analysis service 118 is shown separate from the data visualization engine 112, as can be appreciated, the data visualization engine can be integrated with the data analysis service 118, or other service or service. The user device 110 can present received data or information in any number of ways, and is not intended to be limited herein. As an example, a data visualization 124 can be presented via application 120 of the user device.

Advantageously, utilizing implementations described herein enable generation of data visualizations to be performed in an efficient and more accurate manner (e.g., in accordance with user desires). Further, the data visualizations can dynamically adapt to align with information desired by the user. As such, a user can view desired information and can assess the information accordingly. The user can iteratively update or supplement input to obtain at a desired data visualization automatically generated.

Figure 2:
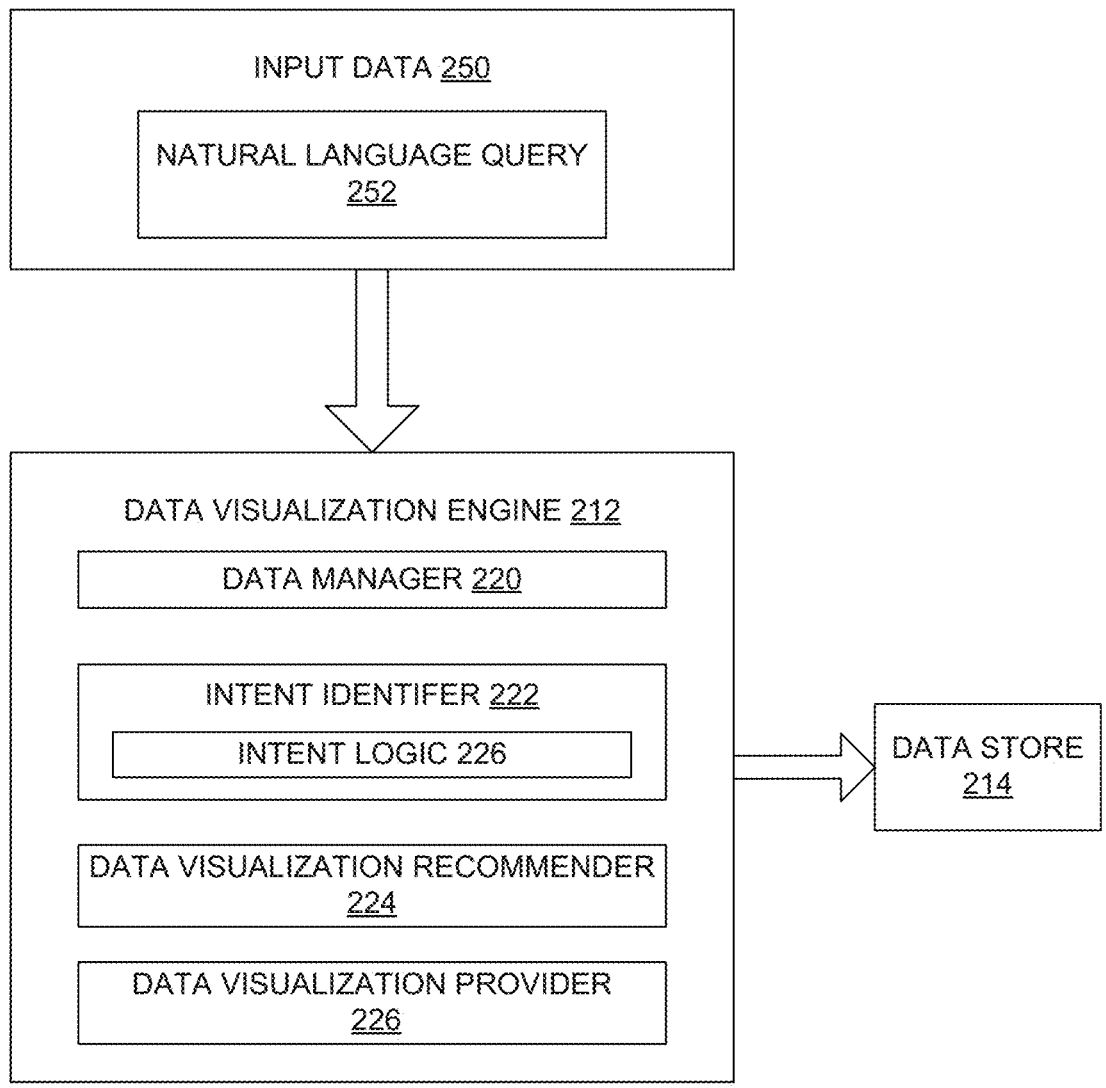
FIG. 2 is an example an example implementation for facilitating generation of data visualizations, via a data visualization engine, in accordance with aspects of the technology described herein.

Turning now to FIG. 2, FIG. 2 illustrates an example implementation for facilitating data visualization, via data visualization engine 212. The data visualization engine 212 can communicate with the data store 214. The data store 214 is configured to store various types of information accessible by the data visualization engine 212, or other server or component. In embodiments, data sources (such as data sources 116 of FIG. 1), user devices (such as user device 110 of FIG. 1), data visualization engine 212 can provide data to the data store 214 for storage, which may be retrieved or referenced by any such component. As such, the data store 214 may store natural language queries, datasets, visualization templates, intent tables, intent inference models, or the like.

In operation, the data visualization engine 212 is generally configured to manage generation of data visualization(s). In embodiments, the data visualization engine 212 includes a data manager 220, an intent identifier 222, a data visualization recommender 224, and a data visualization provider 226. According to embodiments described herein, the data visualization engine 212 can include any number of other components not illustrated. In some embodiments, one or more of the illustrated components 220, 222, 224, and 226 can be integrated into a single component or can be divided into a number of different components. Components 220, 222, 224, and 226 can be implemented on any number of machines and can be integrated, as desired, with any number of other functionalities or services.

The data manager 220 is generally configured to manage data. In this regard, the data manager 220 can receive or obtain input from various components for utilization in generating a data visualization(s). The data manager 220 can obtain input data 250, which can include a natural language query 252. The natural language query, or portions thereof, may be input, selected, or otherwise provided in a textual form or a verbal form via a user interface. Such natural language queries may indicate a manner in which to tailor or customize data visualizations. For example, as previously described, a user may indicate information related to desired data, visual design, and/or insight for a data visualization via a natural language query in unstructured form. Natural language queries, or portions thereof, may be stored, for instance, at data store 214.

The natural language query may be or include a command, a question, a list of words and phrases, or the like. As can be appreciated, the natural language query may include any number of details related to various visualization aspects, such as data, visual design, and/or insight. As one example, a natural language query may be more general or vague (e.g., "show me COVID-19 situation"). As another example, a natural language query may be more specific (e.g., "make a hexbin map using pink and blue colors").

As described, the natural language query may include indications of intent related to data, visual design(s), and/or insight(s). A user may provide any number of intent indications within a natural language query for indicating desired aspects of a data visualization(s). For example, in some cases, a user may indicate intent associated with each of a data aspect, a visual design aspect, and an insight aspect. In other cases, a user may indicate only a portion of such aspects, such as only an insight aspect indicating a type of desired insight.

The data manager 220 may also collect or obtain visualization data for use in generating data visualizations. In embodiments, the data manager 220 can obtain visualization data that corresponds with the natural language query, or portion thereof. Such visualization data may include various types of data that indicate information associated with data visualizations. For example, visualization data may include a dataset(s), a visualization template(s), an intent table(s), and/or the like. A dataset(s) may include any set of data obtained for generating a data visualization. A visualization template(s) may include a template(s) of a design for use in generating a data visualization. An intent table(s) may include a table of intents for use in identifying intent associated with a natural language query.

Such visualization data can be accessed via data store 214, which may obtain visualization data from any number of devices, including data sources such as data contributor devices or template contributor devices. For example, a data contributor device used by a data contributor may provide a dataset that may be used for generating data visualizations. A data contributor may be an individual or entity that publishes data (e.g., cleaned data tables) for utilization. In some cases, a data contributor may be the same as, or related to, a user initiating a data visualization generation. In other cases, a data contributor may be a third-party to a user initiating a data visualization generation. For instance, a data contributor may be an entity that publishes cleaned data tables for public reuse. A template contributor device used by a template contributor may provide a design template that may be used for generating data visualizations. In some cases, a template contributor may be the same as, or related to, a user initiating a data visualization generation. In other cases, a template contributor may be a third-party to a user initiating a data visualization generation. For instance, a template contributor may be an entity intending to popularize a novel chart design, distinct styles, animated transitions, or new interaction techniques.

As described, the data contributor device and/or template contributor device may be client devices operated to provide such visualization data. In other embodiments, the data contributor device and/or template contributor devices may be servers or services that capture such data and make such data accessible to others. For example, a server may be in communication with various template contributor devices to obtain a set of templates that may be used for data visualizations.

Intent tables may be generated in accordance with the datasets and/or the visualization templates. For instance, based on the type of data corresponding with the datasets and/or visualization templates, intent tables may be generated or updated. The intent tables may be manually generated (e.g., by a programmer) or may be automatically generated (e.g., via data manager 220) based on analysis of the datasets and/or visualization templates. The intent tables can be predetermined or predefined to encompass a set of possible intents to identify in association with natural language queries. Different intent tables may correspond with different intent types. For example, a data intent table may include intents associated with data, a visual design intent table may include intents associated with visual design, and an insight intent table may include intents associated with insights. In some cases, intent tables may be general and for use with any dataset. In other cases, intent tables may be specific to a dataset(s). Although generally described as intent tables, the various intents may be included or represented in other formats, and are not intended to be limited to a table structure.

Such data can be stored in the data store (e.g., via an index or lookup system) for subsequent utilization by the data visualization engine 212. Although described as accessing visualization data from data store 214, visualization data can alternatively or additionally be obtained from other components, such as, for example, directly from contributor devices or servers in communication with contributors devices, another data store, or the like.

In embodiments, the data manager 220 may obtain or reference data based on a user indication, or input natural language query. For example, in some cases, a user may select to view information associated with a dataset(s) (e.g., via a natural language query). In such a case, the data manager 220 may obtain the desired dataset(s) for generating the data visualization. As another example, in cases in which intent tables correspond with a particular dataset, intent tables corresponding with the dataset for use in generating a data visualization(s) are accessed.

The intent identifier 222 is generally configured to identify or infer intent(s) associated with a natural language query. In particular, the intent identifier 222 identifies any indications of data, visual design, and insight-related intents from an obtained natural language query. An intent generally refers to a goal or objective a user desires to attain. In embodiments, the intent identifier 222 can recognize a data intent(s), a visual design intent(s), and/or an insight intent(s) corresponding with a natural language query. Data intent generally refers to an intent associated with a dataset. A data intent may include, for example, a data table of interest, a data field of interest, a data field not of interest, a data type of interest, a data type not of interest, etc. Visual design intent generally refers to an intent associated with a visual design for presenting data. A visual design intent may include, for example, a chart type, a chart name, a coordinate system, a style, etc. An insight intent generally refers to an intent associated with an insight related to a dataset. An insight intent may include, for example, a retrieve value, a sort, an anomaly, a correlation, etc.

In this way, the intent identifier 222 can parse the natural language query and detect indications of user intent(s) therefrom. In identifying intent, the intent identifier 222 can identify candidate intent sets. A candidate intent set is generally used to refer to a set of information, data, or metadata that may indicate an intent (e.g., a particular data intent, visual design intent, or insight intent) and/or corresponding intent attributes. An intent attribute generally refers to any attribute, parameter, argument, or data that corresponds with a particular intent. In some cases, the intent attribute may constrain or specify aspects associated with the intent. For example, an intent attribute may specify a particular table name, a particular data field, a particular style, etc. As described herein, a candidate intent set, or portion thereof, can be used to identify one or more inferred intents associated with an input natural language query.

To identify candidate intent sets, the intent identifier 222 can analyze a natural language query to identify and/or match intent indications (e.g. intent keywords) with intent attributes. For example, a candidate intent set may include an intent keyword(s) from a natural language query and an intent attribute(s) associated therewith.

Candidate intent sets may be generated in any number of ways. In embodiments, the intent identifier 222 may analyze a natural language query, or parsed natural language query, to identify intent keywords and/or corresponding intent attributes in the query. As described, an intent keyword generally refers to a keyword that indicates an intent, and intent attribute generally defines, constrains, or otherwise provides information related to an intent.

To identify and/or match intent keywords and intent attributes, the intent identifier 222 may use any number of approaches or operations. In this regard, intent logic 228 may include rules, conditions, associations, models, or other criteria, to identify and/or match intent keywords and intent attributes in association with a natural language query. Intent logic 228 may take different forms depending on the mechanism used to determine intent keywords and/or attributes. For example, intent logic 228 may include utilization of keyword lexicons, regular expressions, grammar rules, statistical model, fuzzy logic, neural network, finite state machine, support vector machine, logistic regression, clustering, or machine-learning techniques, similar statistical classification processes, or combinations of these to identify and/or match intent keywords and/or intent attributes.

For example, in some implementations, keyword lexicons, regular expressions, grammar rules, and/or knowledge graphs may be used to identify and/or match an intent keyword(s) and corresponding intent attribute(s) to include in a candidate intent set. Keyword lexicons can be used to identify an explicitly stated intent keyword (e.g., "cluster") and/or intent attributes, such as data table names, column names, data values, operands (e.g., "count"), visualization template names, style names (e.g., "summer colors"), chart component names (e.g., "legend"), and so on. Intent keywords and/or intent attributes may be predefined (e.g., keywords that imply intents or words identified via a dataset, such as field names) or may be extracted at runtime (e.g., data table names, visualization template names).

In some cases, keyword lexicons can be used to extend intent keywords and/or intent attributes identified from a natural language query. For example, operation of a keyword lexicon can implement approximate keyword matching to tolerate typos. Keyword matching may be implemented using case-insensitive Levenshtein distance or string length, for example. Such an operation can enable support of different capitalization conventions and excuse typos. Generally, the longer the word, the more typos that can be tolerated.

As another example of extending intent keywords and/or intent attributes identified from a natural language query, a keyword lexicon(s) can be extended to match synonyms and/or antonyms of intent keywords and/or intent attributes. In this regard, synonyms or antonyms for identified intent keywords and/or intent attributes can be identified via a keyword lexicon (e.g., WordNet synonyms) to identify additional intent keywords and/or attributes to include in candidate intent sets.

Regular expressions can also be used to identify and/or match intent attributes and/or intent keywords. A regular expression generally refers to a pattern that is used to match an input. That is, a regular expression is a sequence of characters specifying a search pattern. Regular expressions may be used to identify various intent keywords or attributes, such as time/date (e.g., "Oct. 5, 2019"), range (e.g., "[0,700]", "one to six"), currency (e.g., "$153"), etc.

Grammar rules may also be used to identify and/or match intent keywords and intent attributes. A grammar rule may define a number and/or a type(s) of intent attribute accepted by or corresponding with an intent keyword. For example, a grammar rule may indicate two values are desired in association with a correlation-type intent. Another example of a grammar rule includes recognition of an order of intent attributes. As can be appreciated, an order of intent attributes may influence results (e.g., "order by NY, CA, WA" and "order by WA, CA, NY" will result in different charts). As such, a grammar rule may be used to recognize an order of arguments. Another grammar rule may be configured to identify multiple parallel intents in a natural language query that cannot be executed in combination in a single visualization but can be separately executed in multiple visualizations. For example, "covid confirmed, deaths, recovery maps" should result in three maps in concatenation. As another example, "covid cases in maps, bars, and lines" explores three chart types in parallel. The identified parallel intents can be indicated, for example, via inclusion in separate candidate intent sets, or metadata associated therewith.

A knowledge graph, such as a visualization knowledge graph, may also be used to identify and/or match intent keywords and intent attributes. By way of example only, consider the following three queries: "it's too colorful," "reduce color saturation," "use pastel color palettes." With a visualization knowledge graph, it is understood that pastel color palettes are not very colorful and are not very saturated. As such, pastel color palettes can satisfy the above three queries.

As can be appreciated, in some cases, an intent keyword or a corresponding intent attribute may not be identified from a natural language query. For instance, in some cases, either an indication of an intent and/or corresponding attributes may not be explicitly stated in a query (e.g., "correlation between cases and population"). In cases in which an intent keyword or intent attribute (e.g., any or a desired attribute(s), such as "what correlates with cases?"), a default or placeholder value, or otherwise identified value, may be identified and included in a candidate intent set. As one example, in cases in which an indication of an intent keyword and intent attributes are not both included in a query, the intent identifier 222 can infer one using the other. For instance, the query "map" intends to constrain "chart type=map." As such, the intent identifier 222 can infer the "chart type" intent keyword by recognizing its argument "map." As described herein, the data visualization recommender 224 can additionally or alternatively perform identification of missing intent keywords and/or attributes.

In accordance with identifying and/or matching intent keywords and intent attributes (e.g., via intent logic 228), the intent identifier 222 can use such data to generate candidate intent sets. The candidate intent sets may be captured in any number of configurations. In some cases, each intent keyword(s) indicating a particular intent and a corresponding attribute(s) may be in a separate candidate intent set. For example, a first intent keyword and corresponding attribute(s) may be included in a first candidate intent set, and a second intent keyword and corresponding attribute(s) may be included in a second candidate intent set. In this example, a keyword intent may be paired with one intent attribute in a candidate intent set or may be paired with multiple intent attributes in a candidate intent set. As a specific example, an intent keyword "map" may be paired with "sales" in one candidate intent set and may be paired with "revenue" in another candidate intent set. In other cases, any intent indicators/keywords and corresponding attribute(s) may be in a single candidate intent set. For example, a first intent keyword and corresponding attributes as well as a second intent keyword and corresponding attributes may be included in a candidate intent set. In yet other cases, any intent indicators/keywords and corresponding attributes associated with a particular type of intent (e.g., data intent) may be included in a set. For example, a dataset intent keyword and corresponding attributes may be included in a dataset candidate intent set, and a design intent keyword and corresponding attributes may be included in a design candidate intent set.

In accordance with determining candidate intent sets associated with a natural language query, intent identifier 222 can use the candidate intent set to identify or infer an intent. As described herein, inferred or identified intents may be dataset intents, visual design intents, and/or insight intents. Although generally described herein as including three types of intents, as can be appreciated, additional or fewer types of intents may be identified. For each type or category of intent (e.g., data intent, visual design intent, insight intent), a predetermined set of intents may exist. As described, advantageously, limiting the number of intents can enable an efficient process used to identify intents. The specific intents (e.g., included in an intent table for a particular type of intent) may be predetermined in advance of initiating data visualization in association with a natural language query. For example, the specific intents may be user specified in advance (e.g., specified by a programmer, specified by a data contributor, specified by a visualization template, etc.), automatically identified based on analysis of a dataset, a visualization template, etc., or the like. FIG. 3 provides an example data intent table 302, design intent table 304, and insight intent table 306. Example query language that may correspond with the various intents are also illustrated in FIG. 3.

To identify or infer an intent(s) associated with a query, the candidate intent set(s) may be used. In one embodiment, a candidate intent set, or portion thereof, may be input into an intent inference model(s) to identify or infer an intent. One example of an intent inference model includes a machine learned model (e.g., a classification model). A machine learned model to infer intent may be trained using various queries and intent labels collected from prior data. In embodiments, a set of intent inference models may be used to estimate probabilities of a natural language query including each intent. For example, for each intent in a table of intents, a corresponding classification model may be trained to predict for an input candidate intent set, or portion thereof, a probability of the particular intent corresponding with the input candidate intent set. As such, a candidate intent set, or portion thereof, can be input into a classification model associated with a first intent to identify a probability of the candidate intent set including the first intent, a classification model associated with a second intent to identify a probability of the candidate intent set including the second intent, and so forth. Each intent inference model can output a probability indicating a likelihood that the input candidate intent set, or corresponding natural language query, includes the intent for which the intent inference model was trained. For example, with brief reference to FIG. 3, a candidate intent set can be input into an intent inference model corresponding with "select data table" intent 310 of FIG. 3 to generate a probability the candidate intent set and/or natural language query includes a "select data table" intent.

As can be appreciated, multiple candidate intent sets associated with a natural language query can be input into a same intent inference model to obtain corresponding (e.g., different) probabilities. For instance, assume a first candidate intent set includes an intent keyword-attribute pair of "map: sales," and a second candidate intent set includes an intent keyword-attribute pair of "map: revenue." In such a case, the first candidate intent set can be input into an intent inference model for a particular intent to obtain a corresponding probability, and the second candidate intent set can be input into the same intent inference model to obtain a corresponding probability associated with the particular intent.

In some cases, a candidate intent set may be input into each intent inference model to obtain probabilities of corresponding intents (e.g., each intent inference model associated with data intents, each intent inference model associated with design intents, and each intent inference model associated with insight intents). In other cases, a candidate intent set may be input into a portion of intent inference models. For example, in cases in which a candidate intent set is specific to a type of intent (e.g., data intent), the candidate intent set may be input into intent inference models associated with that particular type of intent. For instance, if the candidate intent set includes data related to the design intent, the candidate intent set may be input into each intent inference model associated with the design intent, but not intent inference models related to data intent or insight intent.

Although generally described herein as each intent having a corresponding intent inference model, various implementations may be used. For example, each type of intent (e.g., dataset intent, visual design intent, and insight intent) may have a corresponding intent inference model that provides output specifying various intents and corresponding probabilities. Further, although generally described as inputting candidate intent sets into intent inference models, other data may alternatively or additionally be input into such models (e.g., natural language queries).

The intent identifier 222 can provide the inferred intents associated with the natural language query to the data visualization recommender 224. In some cases, the intent identifier 222 may communicate each inferred intent and corresponding probability to the data visualization recommender 224. In other cases, the intent identifier 222 may communicate each inferred intent, and corresponding probability, that exceeds a probability threshold (e.g., 0.06) or is included in a set of highest probabilities (e.g., a top 3 highest probabilities). For example, for each type of intent (e.g., data intent, visual design intent, and insight intent), an indication of the three intents having the highest probabilities is provided to the data visualization recommender 224.

In addition to providing inferred intents and corresponding probabilities to the data visualization recommender 224, the intent identifier 222 may provide the corresponding candidate intent set (e.g., intent keywords, intent attributes, etc.) and/or the natural language query, or portions thereof. In this regard, the data visualization recommender 224 can obtain the data (e.g., intent keywords and intent attributes) resulting in the corresponding inferred intent and probability. In some implementations, the candidate intent sets may be extended or supplemented with the corresponding intents and/or intent probabilities. Embodiments described herein provide examples of various combinations of data that can be provided to the data visualization recommender 224 and used for generating data visualizations, but are provided for illustrative purposes only. As can be appreciated, any combinations of data are contemplated within the scope for use in generating data visualizations.

The data visualization recommender 224 is generally configured to recommend data visualizations. Generally, the data visualization recommender 224 recommends data visualizations based on the natural language query. In this regard, the data visualization recommender 224 can use the natural language query, and/or information derived therefrom, to determine a recommended data visualization(s).

To generate data visualization recommendations, the data visualization recommender 224 can generate an intent recommendation set. An intent recommendation set generally refers to a set of candidate intent recommendations. A candidate intent recommendation refers to a recommendation or combination of dataset intent data, visual design intent data, and insight intent data to be analyzed to identify data visualization recommendations. Such data related to dataset intent, visual design intent, and insight intent may be any type of data including, for example, an indication of the particular intent (e.g., select data field), intent probabilities, intent keyword, intent attributes, candidate, intent sets, etc. In this regard, the intent recommendation set may include various candidate intent sets, including data candidate intent sets, visual design candidate intent sets, and an insight candidate intent sets.

An intent recommendation set may be generated in any number of ways. As one example, intents having a probability above a threshold may be used to identify corresponding data (e.g., candidate intent sets) for an intent recommendation set. In some cases, attributes corresponding with intents exceeding a predetermined threshold are included in the intent recommendation set. In one example implementation, an intent recommendation set may include three types of intents and/or corresponding data, namely, data field selections and transformations D, visualization designs and customization V, and statistical insights I associated with a natural language query:

$D=\{d_1, d_2, \ldots\}$
$V=\{v_1, v_2, \ldots\}$
$I=\{i_1, i_2, \ldots\}$

Various data may be included or represented in the set of recommendation intents. For example, $d_1$ may include a first inferred data intent, a corresponding intent probability, and a corresponding candidate intent set (e.g., intent keyword and intent attribute(s)), while $d_2$ may include a second inferred data intent, a corresponding intent probability, and a corresponding candidate intent set.

As described, the inferred intents, and/or corresponding data (e.g., probabilities, intent keywords, intent attributes, candidate intent sets, etc.), are provided to the data visualization recommender 224 (e.g., from the intent identifier 222). In some cases, an inferred intent, and/or data associated therewith, for a particular type of intent is not provided or a default value is inferred. For example, a natural language query may not include an indication of a design and, as such, a design intent is not detected or a default value may be included as the design intent. In this regard, the natural language query may be missing indications of one or more intents (e.g., one or two of D, V, and I may be empty). Additionally or alternatively, an intent keyword and/or intent attributes may not be recognized or detected within a natural language query.

In embodiments, a default value inferred for a particular type of intent may be dynamically determined. In this way, for example, the data visualization recommender 224 can determine an appropriate default value based on other user-specified intents. For example, assume a query only includes data intents "date" and "total revenue." In such a case, the data visualization recommender 224 may auto-fill the missing design intent to be "chart type=line," instead of using a more common but less appropriate "chart type=bar" default value. To determine a best or most appropriate default value, the data visualization recommender 224 may use rules that can be learned in various ways, such as findings of empirical studies or analysis of log data that observes created visualizations.

Accordingly, the data visualization recommender 224 may identify or infer an intent(s), or information associated therewith (e.g., intent attributes), for use in determining a data visualization recommendation(s). By way of example only, assume a visual design intent and an insight intent are determined via the intent identifier 222 and communicated to the data visualization recommender 224. In such cases, the data visualization recommender 224 may identify a missing, or default value, for a dataset intent associated with a natural language query and, as such, determine a dataset intent for the natural language query. Additionally or alternatively, the data visualization recommender 224 may recognize missing or default dataset attributes and determine one or more dataset attributes for the data intent.

As such, information provided by the intent identifier 222 and generated by the data visualization recommender 224 may be included in the intent recommendation set. For example, the data visualization recommender 224 may use the information provided by intent identifier (e.g., inferred intents, probabilities, intent keywords, intent attributes, candidate intent sets, etc.) to generate an intent recommendation set and extend the intent recommendation set, for example, by replacing default values identified by the intent identifier 222.

In such cases, the data visualization recommender 224 may extend D, V, and I by replacing a default value(s) identified via the intent identifier 222. In such a case:

$D_x \subset D$
$V_x \subset V$
$I_x \subset I$

Such extended sets can then be used to form an intent recommendation set R:

$R = \{d, v, i\}, d \in D_x, v \in V_x, i \in I_x$

Identifying an intent, or data associated therewith (e.g., an intent attribute), for use in determining a data visualization recommendation may be performed in any of a number of ways. For example, assume a "select data field" intent is identified as an intent related to data (e.g., selected as a default intent by the intent identifier or the data visualization recommender when no data intent is identified via the natural language query). In such a case, the data visualization recommender 224 may identify that no particular data field is indicated (e.g., within a candidate intent set) as an intent attribute for the data intent. Accordingly, the data visualization recommender 224 may identify a set of data fields to designate as intent attributes. For instance, the data visualization recommender 224 may identify a set of most frequently accessed or most frequently used data fields and designate such data fields as intent attributes. As another example, the data visualization recommender 224 may identify a set of most relevant fields in relation to a dataset or a natural language query and include such fields as intent attributes for a particular natural language query.

In some cases, the data visualization recommender 224 may identify various intents, and/or information associated therewith (e.g., intent keywords or intent attributes), to fill an empty or missing value or to replace or supplement a default value. For instance, a missing or default intent attribute associated with a particular type of intent may be filled or replaced with any or all eligible data values (e.g., based on analysis of the dataset, visualization template, intent table, etc.). By way of example only, assume an intent identified from a natural language query generally includes intent attributes of a categorical value and a numerical value. In such a case, the data visualization recommender 224 may identify any eligible intent attributes (e.g., from the dataset) associated with a categorical and a numerical value. Identifying various eligible intents, or intent attributes, enables the data visualization recommender 224 to consider and rank more data visualization recommendations.

As can be appreciated, in some implementations, the data visualization recommender 224 may only extend the intent recommendation set in cases in which intent and/or attributes associated therewith are missing or unknown. For example, if an intent is identified with a high probability and includes corresponding data attributes, the data visualization recommender 224 may not generate further intents and/or attributes. Accordingly, the user is more likely to be presented with desired information.

The data visualization recommender 224 can use the intent recommendation set to identify or determine data visualizations to recommend in association with a natural language query. To do so, in one embodiment, the intent recommendation set is used to bind data to various visualization templates. In particular, various candidate intent recommendations within the intent recommendation set may be bound to various visualization templates. A visualization template generally refers to a template used to create a data visualization, such as a chart, diagram, or the like. A visualization template can be customized using various information in an intent recommendation set. In this regard, various candidate combinations of dataset intent, visual design intent, and insight intent, and data associated therewith (e.g., data attributes), can be bound to various visualization templates.

Figure 4:
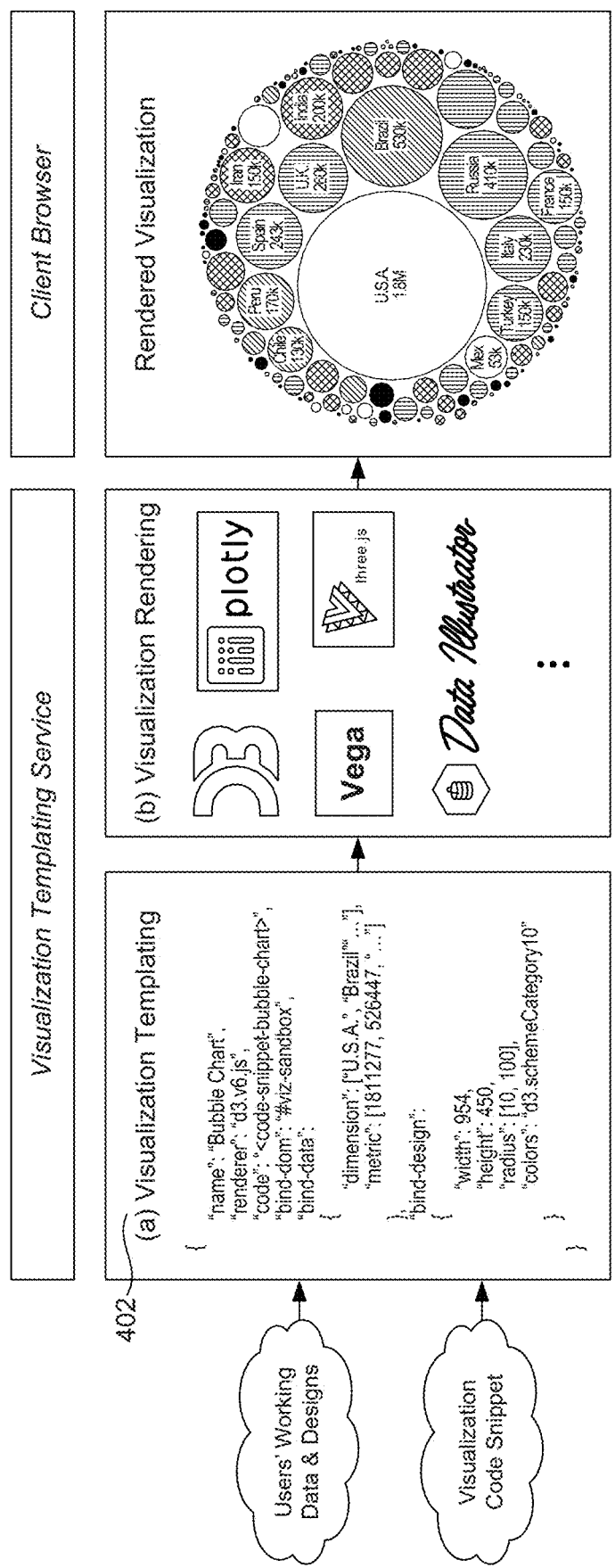
FIG. 4 provides an example of visualization templating, in accordance with aspects of the technology described herein.

By way of example only, and with reference to FIG. 4, an example visualization template 402 is provided. In this example visualization template 402, <code-snippet-bubble-chart> refers to the source code of a bubble chart visualization obtained from a visualization gallery. The data visualization recommender 224 can use the "bind-data" and "bind-design" fields to update the source code dynamically according to users' working data and customized designs (e.g., by inputting appropriate data attributes into the code). In some cases, the particular visualization templates to use to bind data may be selected or determined, for example, based on an intent or intent attributes (e.g., select only graph visualizations or only bar chart visualizations based on intent attributes). In other cases, each visualization template may be accessed and used to bind data thereto.

Binding or matching various combinations of intent data to various data visualizations enables detection of eligible data visualizations. For example, assume a first intent recommendation in the intent recommendation set includes $d_1$, $v_1$, and $i_1$. In applying the first intent recommendation to a set of visualization templates, the data visualization recommender 224 may identify that the first intent recommendation includes data required or needed to bind with the first visualization template, while it does not with the second visualization template (e.g., the first intent recommendation is missing necessary information to facilitate rendering of the second visualization template). In some cases, in accordance with identifying a visualization template that is not eligible with a particular intent recommendation, the visualization template may be excluded or removed as a candidate visualization template.

The data visualization recommender 224 can identify or determine a recommendation value or score for candidate intent recommendations. Such a recommendation value or score can indicate an extent that a particular candidate intent recommendation (e.g., d, v, and i combination) is likely to be desired by a user. In embodiments, the data visualization recommender 224 may determine such a recommendation value or score using intent probabilities and/or intent popularities. Although intent probabilities and/or intent popularities are described herein for use in determining a recommendation score, as can be appreciated, other factors or aspects may additionally or alternatively be used to identify an extent to which an intent recommendation combination matches an input natural language query.

As previously described, an intent probability generally refers to a probability a particular intent corresponds to a natural language query. Intent probabilities can be determined in any number of ways, some of which are described above with respect to the intent identifier 222. As such, intent probabilities corresponding with various intent components can be obtained from the intent identifier 222. In some cases, intent probabilities may additionally or alternatively be determined via the data visualization recommender 224 (e.g., in cases that a data visualization recommender 224 identifies a missing intent or a replacement intent for a default value).

Intent popularity generally refers to an extent of popularity of a particular intent, intent attribute, and/or visualization template. By way of example only, popularity may refer to popularity or frequency of accessing or using an aspect, or may refer to popularity indicated based on reviews, feedback, etc. (e.g., from a particular user or entity, or from a network or group of users or entities). As one example, assume an intent attribute indicates a particular data field to use for a visualization. In such a case, the data field may have a corresponding popularity that is used to determine a score for the data intent component of the intent recommendation. The data field popularity may be based on usage of that data field in other data visualizations, for example.

The data visualization recommender 224 can generate an intent recommendation score in any number of ways. As one example, an intent recommendation is scored using the following formula:

$$\text{score} = \frac{1}{|r|} \sum_{x \in r} w(x) \cdot |x|$$

$$r = \{d, v, i\}$$

In this example, $|x|$ reflects the probability of the particular intent corresponding with the input candidate intent set (as described above). Further, r represents a particular intent recommendation with a particular combination of d intent data, v intent data, and i intent data. Such d intent data, v intent data, and i intent data may include various types of information, such as intents and a corresponding data attribute(s). For instance, i intent data may include an intent and an intent attribute pair (e.g., "map: sales"). Each component (d, v, and i) may include a corresponding weight w. As such, the summation of the weighted components d, v, and i are used to generate a score for the intent recommendation. The components d, v, and i may represent or reflect the corresponding intent probability. As shown, in this example, the score is normalized using the inverse of the absolute value $|r|$. $|r|$ reflects a number of intent recommendations in the intent recommendation set. For example, if the intent recommendation set includes three data components ($d_1$, $d_2$, and $d_3$), three visualization design components ($v_1$, $v_2$, and $v_3$), and three insight components ($i_1$, $i_2$, and $i_3$), the $|r|$ equals 27 as 27 intent recommendation combinations exist in the intent recommendation set.

The intent components (e.g., d, v, and i representing corresponding intent probabilities) can each include a corresponding weight. As described, the weight for each intent component may be based on an intent probability and/or a popularity probability. In some embodiments, an intent probability or a popularity probability may be selected for a corresponding intent component. In one example, a weight may be selected between an intent probability and a popularity probability as follows:

w(x)=max{keyboard similarity to query∈ [0,1], popularity on collaborative platform∈ [0,0,3]}

In this case, an intent probability that is higher indicating a stronger similarity to the natural language query may be selected, while a popularity probability may be selected when the intent probability is lower. As such, the data visualization engine 212 adjusts to provide recommendations more relevant to an input user query or recommendations reflecting a higher popularity. For example, using this score, exact matches to the user query are generally ranked the highest, followed by recommendations that contain trending data, design, and insight intents. Accordingly, in cases that a user is specific on the intent, a high intent probability will exist and more likely result in a desired data visualization. On the other hand, in cases that a user is not specific in intent, the user will more likely be presented with a popular visualization.

As can be appreciated, the recommendation score can be specific to a particular visualization template. In some cases, an indication of the visualization template (e.g., name) may be included as an intent attribute of the intent components (e.g., as a visual design attribute). For example, one intent recommendation may correspond with a first bar graph visualization indicated as a visual design attribute $v_1$, and another intent recommendation may correspond with second bar graph visualization indicated as a visualization attribute $v_2$. In other cases, a particular intent recommendation (e.g., d, v, i combination) may separately correspond with various visualization templates (e.g., a d, v, i combination associated with a first visualization template, the d, v, i combination associated with a second visualization template). In some cases, the intent recommendations can correspond with all visualization templates. In other cases, the intent recommendations can correspond with visualization templates determined to be eligible based on binding the data to the visualization templates. As can be appreciated, the visualization templates may also include popularity scores for use determining a recommendation score. For example, a visualization template accessed or used more frequently may have a higher weight, which can impact the recommendation score when used to weight a corresponding visual design intent component.

The data visualization recommender 224 can use the recommendation scores to select data visualizations to recommend for providing, for example, to a user. As described, a recommendation score can be specific to a particular visualization template. As such, the recommendation scores can be used to rank and/or select data visualizations to recommend. As one example, the recommendation scores can be used to rank the candidate intent recommendations associated with various data visualizations. Recommendation scores exceeding a recommendation threshold value may be used to select the corresponding intent recommendations and/or data visualizations. Alternatively, a set of highest recommendation scores (e.g., 3 highest recommendation scores) may be used to select the corresponding intent recommendations and/or data visualizations.

Upon identifying intent recommendations associated with particular data visualizations for providing, the data visualization provider 226 may provide intent recommendations, or visualizations associated therewith. This can occur in any number of ways. As one example, an intent recommendation and a corresponding visualization template, or indication thereof, may be provided to a data analysis service (e.g., third-party service) that can generate or render the data visualization (e.g., via a server and/or user device). In some cases, the data visualization provider 226 may determine or identify the particular information needed to be communicated for generation or rendering of the data visualization. In other cases, the data visualization provider 226 may provide the source code previously bound to the data attributes. In this regard, the bound source code is sent to its compatible renderer (e.g., data analysis service) to generate its graphical representation (i.e., scalable vector graphics (SVGs) or Canvas) and the graphics can be displayed in a browser or application on the user device. For example, visualizations (e.g., interactive visualizations) can be output in SVG or Canvas and an HTML, snippet can be provided to embed the visualizations in web pages. In yet other cases, the data visualization provider 226 may generate the data visualization and provide to another device for presentation to the user. For instance, the data visualization provider 226 may provide the data visualization directly to the user device (e.g., operating a data analysis service thereon) that input the natural language query. In another example, the data visualization provider 226 may provide the data visualization to another component or service (e.g. data analysis service) that provides the data visualization to the user device obtaining the natural language query from the user.

Figure 5B:
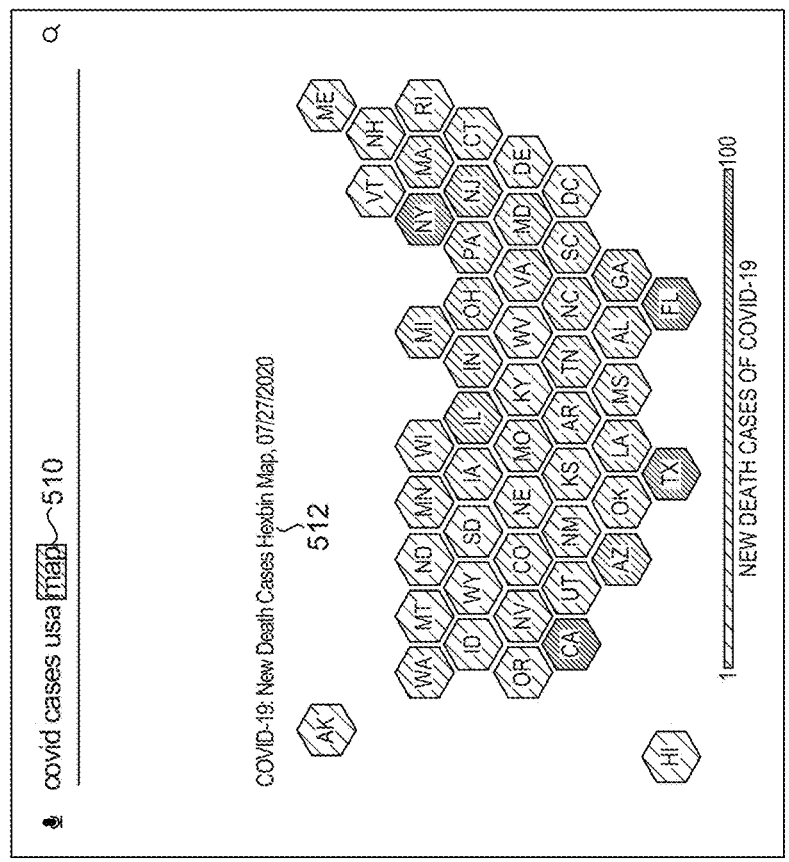
FIGS. 5A-5D provide example user interface experiences related to automated data visualization generation, in accordance with aspects described herein.
Figure 5A:
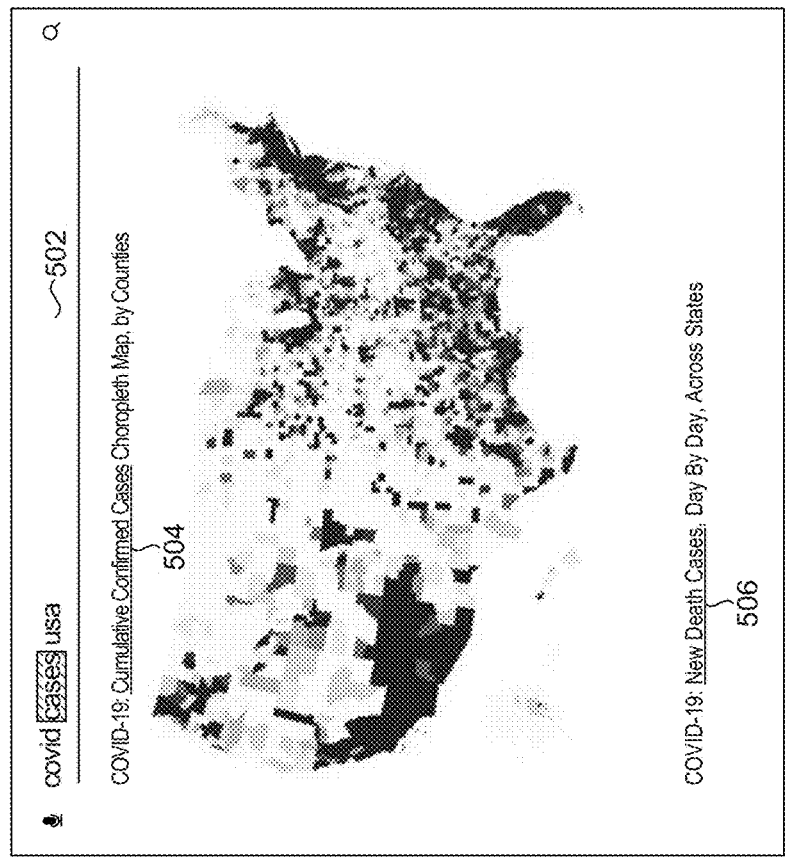

With reference to FIGS. 5A-5D, FIGS. 5A-5D provide illustrative examples of graphical user interfaces in which natural language queries can be input and data visualizations presented. Turning initially to FIG. 5A, FIG. 5A illustrates an input box 502 to receive a natural language query. As shown, a natural language query of "covid cases usa" is input by a user. In this example, the term "cases" could mean several different fields in the dataset, such as "confirmed cases" or "death cases." In embodiments described herein, most relevant fields are identified and provides a data visualization having an appropriate design, such as maps and lines. A data visualization may be illustrated in association with cumulative confirmed cases 504, and a data visualization may be illustrated in association with new death cases 506.

Now assume a user desires to modify or supplement a previously input query. Typically, with conventional tools, a user may need to translate a high-level design concepts like "line chart" or "add a filter" to concrete user interface actions such as clicking a particular button and then selecting from a particular menu. As shown in FIG. 5B, a user may simply supplement or modify a previous query. In FIG. 5B, assume the user supplements a previous query with the term "map," as shown in the input query 510. Embodiments described herein can identify the natural language input to guide a user from a high-level design concept, such as "map," to a specific design, such as "hexbin map" 512 with a pink and blue color scheme, as illustrated in FIG. 5B. To modify the pink and blue color scheme, a user may simply add language to the input query to state a color scheme desired for the map.

Figure 5D:
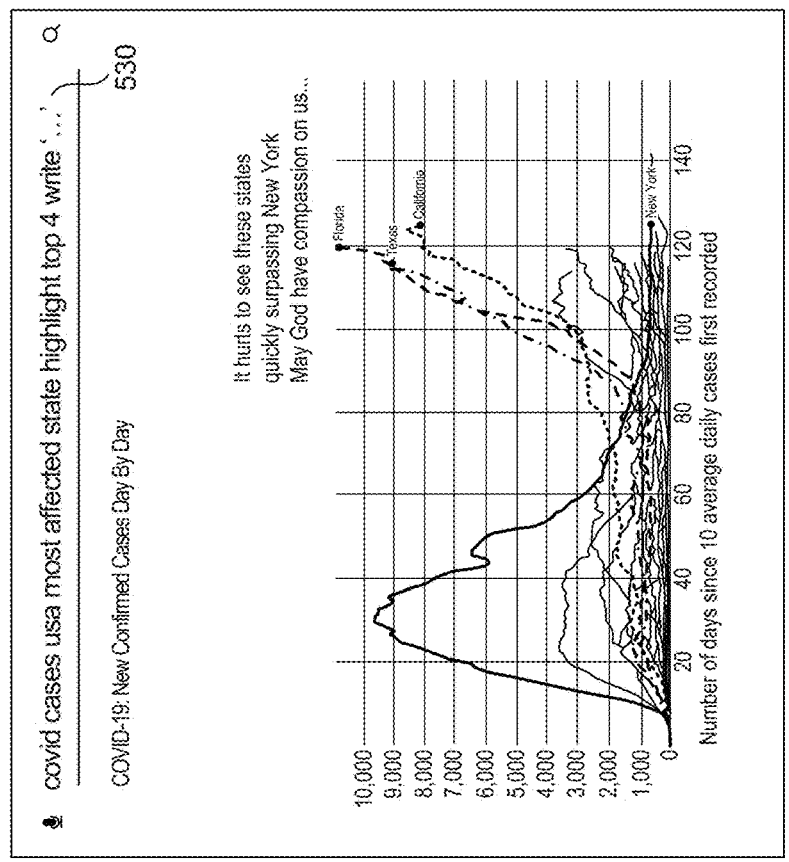
Figure 5C:
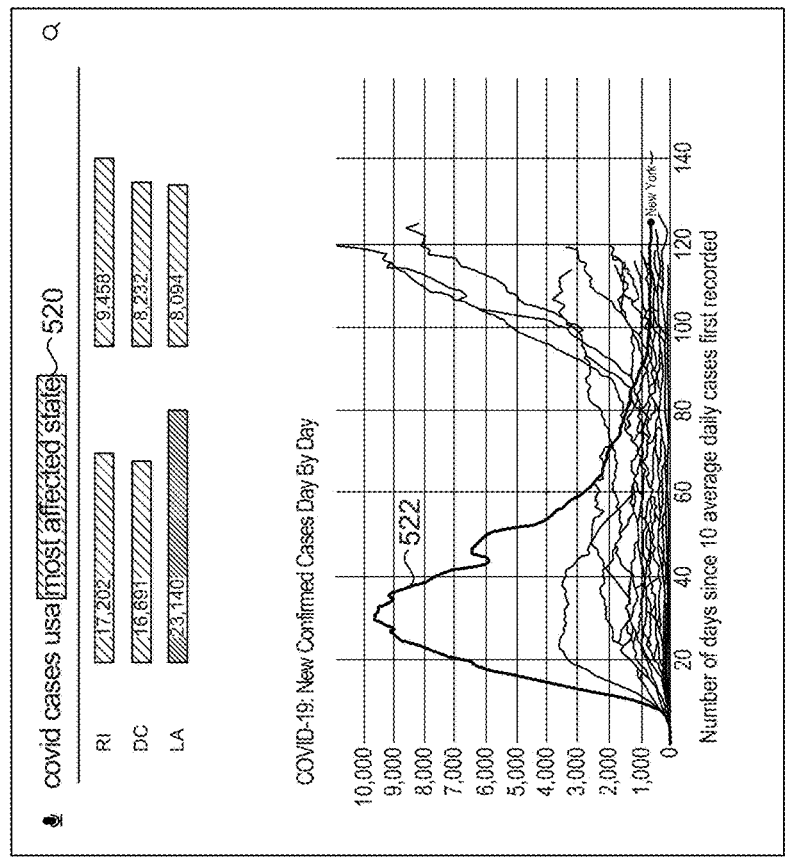

Turning to FIG. 5C, FIG. 5C illustrates customizations related to insight data. Insights, such as distributions, outliers, and correlations, are one aspect that a user may desire to explore data and/or communicate a compelling story. Utilizing embodiments described herein, a user may vaguely describe a desired insight and, in response, be presented with a desired data visualization. For example, assume a user indicates an insight of "most affected state" in a query 520. In such a case, a chart may be presented with covid cases in the USA that automatically includes highlighting, trend lines, text annotations, and/or the like. For instance, in FIG. 5C, the most affected state of New York 522 is highlighted.

As manually highlighting, adding annotations, and performing other customizations may be difficult or time consuming (particularly when an extensive amount of data exists), in accordance with embodiments described herein, a user may simply input a query that specifies such desired customizations. As shown in FIG. 5D, a user may supplement the query 530 with "highlight top 4 states" and "write it hurts to see these states quickly surpassing New York." Based on the input, the data visualization can be updated to highlight and annotate as desired by the user in a presented data visualization.

Figure 6:
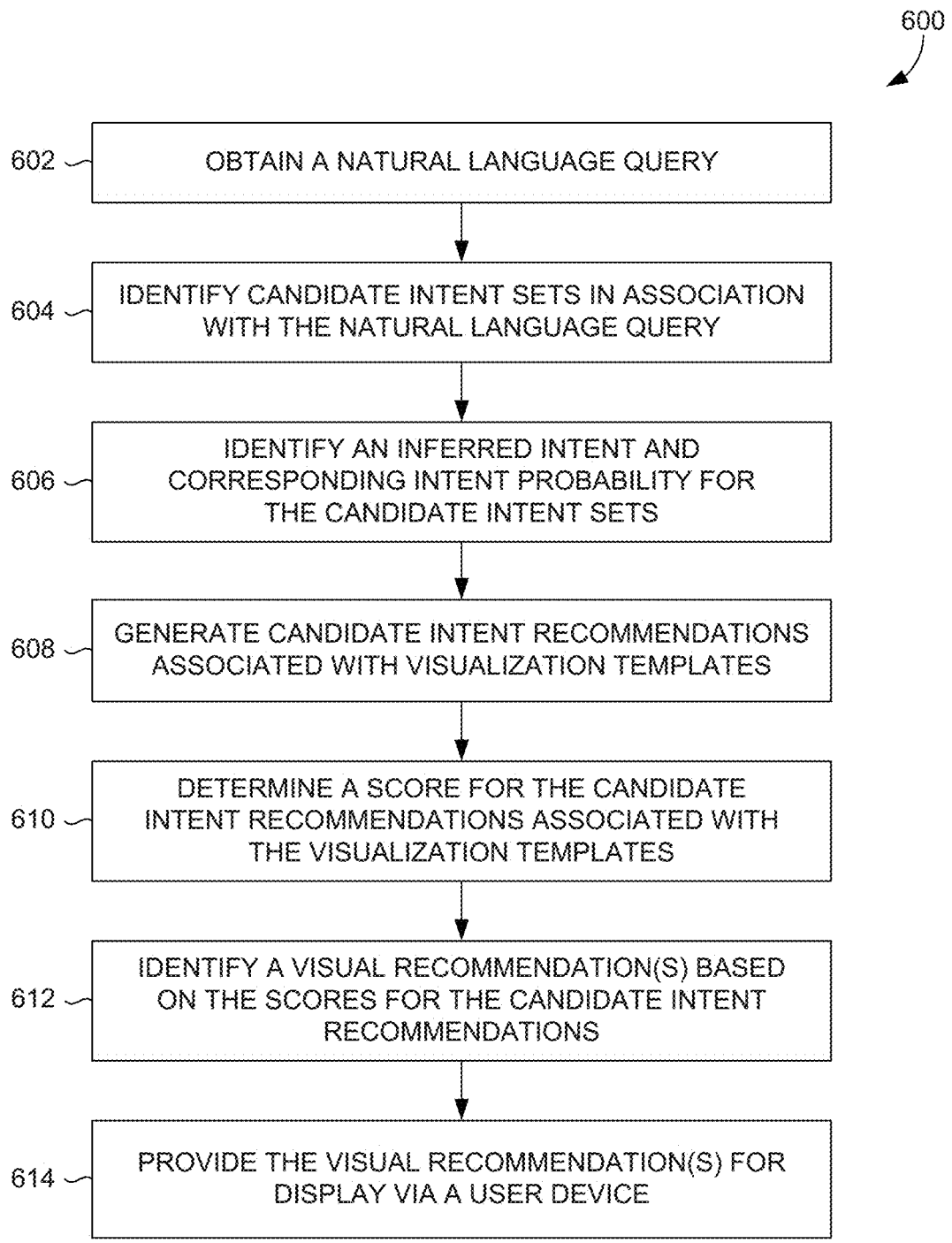
FIG. 6 provides a first example method for facilitating data visualization generation, in accordance with aspects of the technology described herein.
Figure 7:
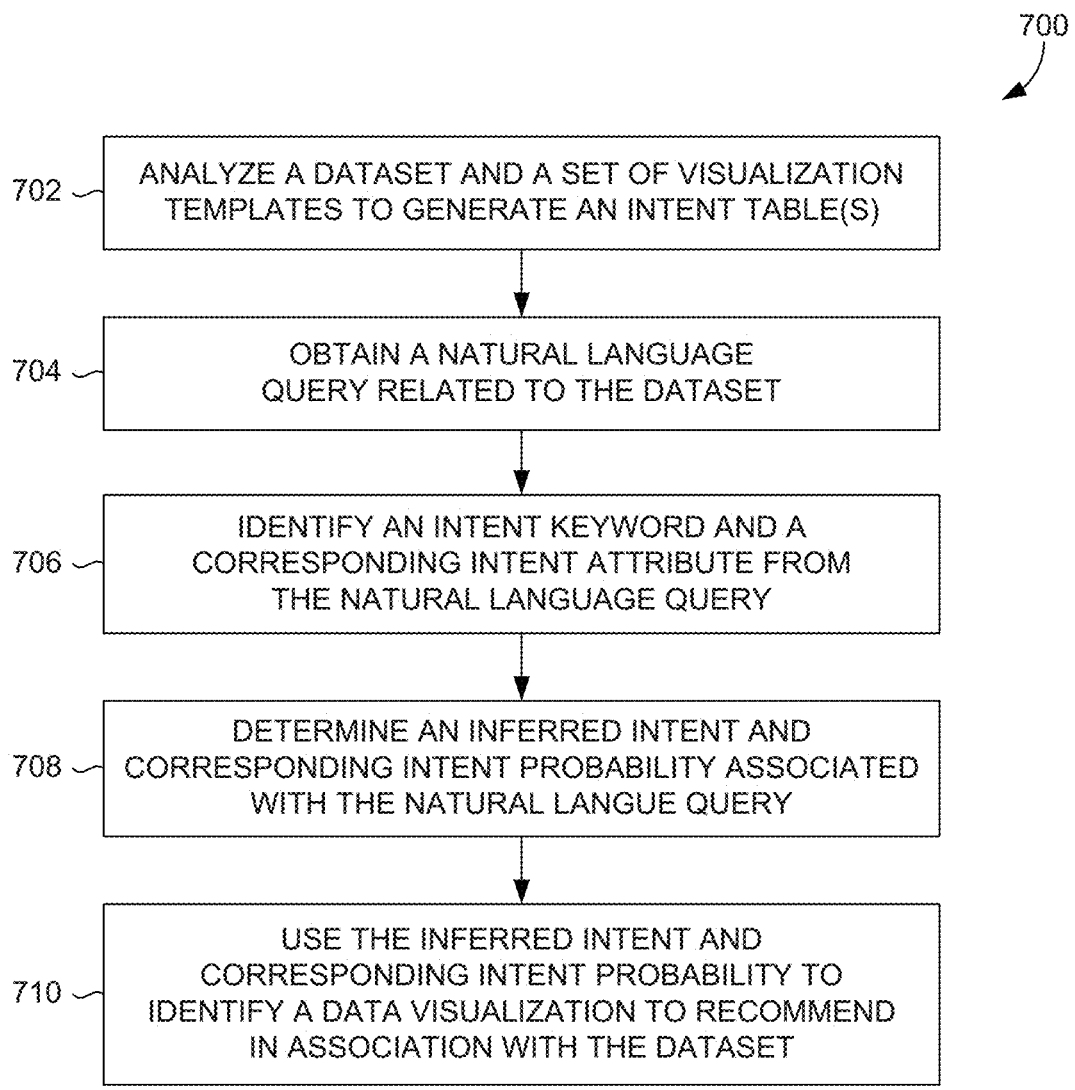
FIG. 7 provides a second example method for facilitating data visualization generation, in accordance with aspects of the technology described herein.
Figure 8:
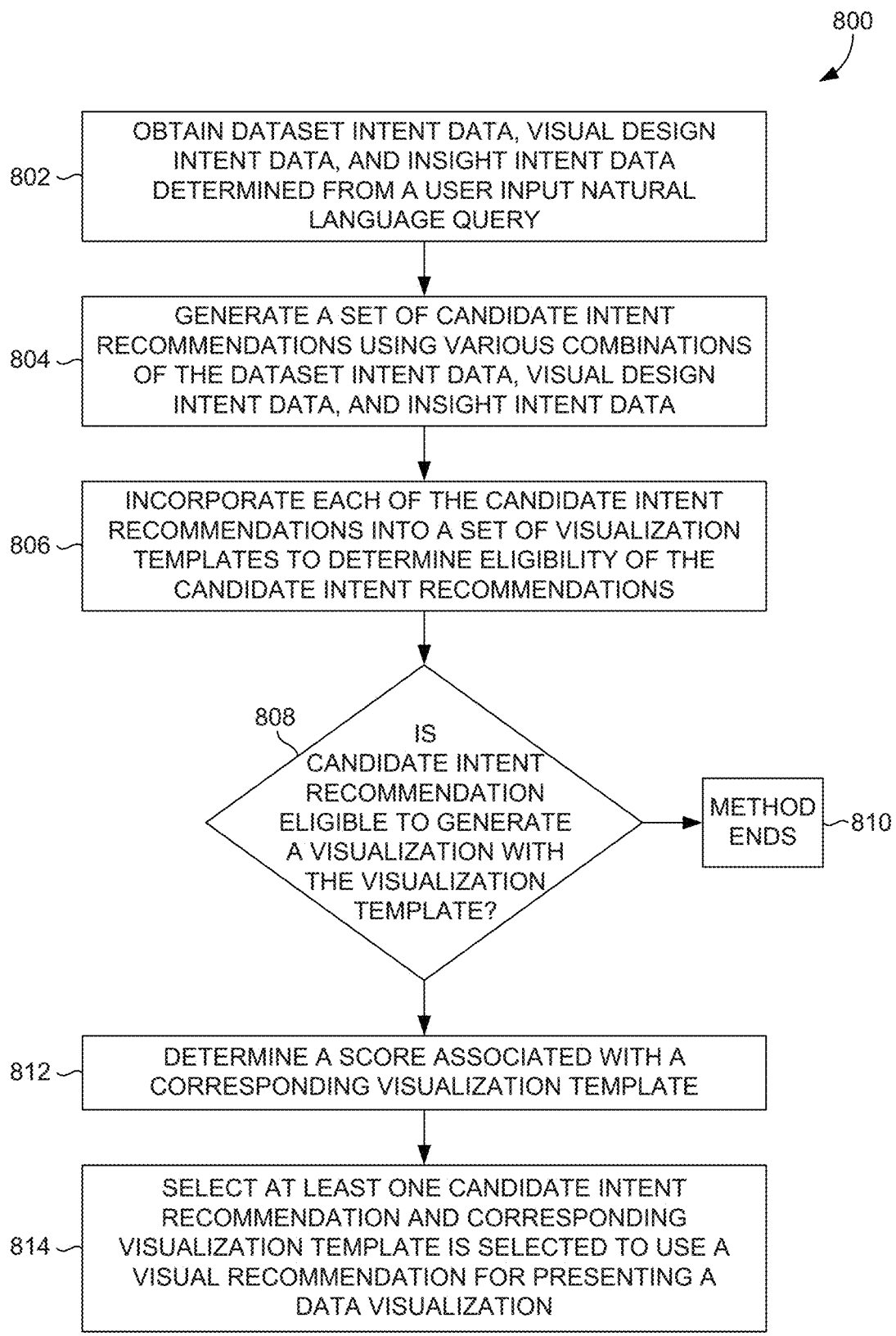
FIG. 8 provides a third example method for facilitating data visualization generation, in accordance with aspects of the technology described herein.

Exemplary Implementations for Facilitating Data Visualizations Based on Natural Language Queries As described, various implementations can be used in accordance with embodiments described herein. FIGS. 6-8 provide methods of facilitating data visualizations based on natural language queries, in accordance with embodiments described herein. The methods 600, 700, and 800 can be performed by a computer device, such as device 900 described below. The flow diagrams represented in FIGS. 6-8 are intended to be exemplary in nature and not limiting.

Turning initially to method 600 of FIG. 6, method 600 is directed to one implementation of facilitating data visualizations based on a natural language query, in accordance with embodiments of the present technology. Initially, at block 602, a natural language query is obtained. A natural language query can be input, for example, by a user at a user device. At block 604, candidate intent sets can be identified in association with the natural language query. A candidate intent set can an intent keyword(s) and a corresponding intent attribute(s) from a user input natural language query. Any number of candidate intent sets may be identified. As can be appreciated, a candidate intent set may be generated for a dataset intent, a visual design intent, and an insight intent. In embodiments, candidate intent sets, such as intent keywords and the corresponding intent attributes, are identified using a keyword lexicon, a regular expression, and/or a grammar rule. As can be appreciated, in some cases, candidate intent sets can be generated directly from explicitly stated input. In other cases, candidate intent sets can be derived from input (e.g., synonyms of input text).

At block 606, an inferred intent and corresponding intent probability can be identified for the candidate intent sets by inputting the candidate intent sets, such as the intent keyword and the corresponding intent attribute, into a plurality of intent inference models that infer intent. In embodiments, each of the intent inference models of the plurality of intent inference models corresponds with a particular intent of a set of predetermined intents corresponding with a dataset. For example, a first dataset intent may correspond with a first intent inference model, a second dataset intent may correspond with a second intent inference model, and so forth.

At block 608, candidate intent recommendations associated with visualization templates are generated. A candidate intent recommendation can includes dataset intent data, visual design intent data, and insight intent data. In embodiments, each candidate intent recommendation may include a combination of candidate intent sets (e.g., a dataset candidate intent set, a visual design candidate intent set, and an insight candidate intent set). As can be appreciated, any number of the candidate intent sets included in a candidate intent recommendation may be determined from the obtained natural language query (e.g. via blocks 602-606). In some cases, a portion of candidate intent sets included in a candidate intent recommendation may be identified or derived despite not being explicitly indicated in the obtained natural language query.

At block 610, a score is determined for the candidate intent recommendations associated with the visualization templates. A score can be determined using intent probabilities and/or popularity probabilities associated with each of the dataset intent data, visual design intent data, and insight intent data of the candidate intent recommendation. For example, assume a candidate intent recommendation includes intent components $d_1$, $v_1$, and $i_1$. One or more of intent components $d_1$, $v_1$, and $i_1$ may correspond with an intent weight and a popularity weight. For each intent component, an intent weight or popularity weight may be selected as a weight in determining a score for a candidate intent recommendation. For example, for intent component $v_1$, an intent weight may be determined at block 606, and a popularity weight may indicate a popularity of the corresponding visualization template. In embodiments, a greater of the two weights may be selected to weight the intent component $v_1$ (e.g., the intent component may be the visual design intent probability determined via block 606).

Based on the scores for the candidate intent recommendations, at block 612, a visual recommendation(s) is identified. For example, candidate intent recommendations having scores higher than a threshold value or a predetermined number of candidate intent recommendations having highest scores may be selected and identified for a visual recommendation. At block 614, the visual recommendation(s) is provided, for example, for display via a user device.

Turning to FIG. 7, method 700 of FIG. 7 is directed to another example implementation of facilitating data visualizations based on a natural language query, in accordance with embodiments of the present technology. Initially, as indicated at block 702, a dataset and a set of visualization templates are analyzed to generate an intent table(s). Such an intent table(s) may include intents associated with the dataset, the visualization templates, and insights. Thereafter, at block 704, a natural language query related to the dataset is obtained. The natural language query may be input by a user via a graphical user interface. In some cases, the dataset may also be indicated by the user. At block 706, an intent keyword and a corresponding intent attribute are identified from the natural language query. For example, an intent keyword-attribute pair may be generated from analysis of the natural language query. At block 708, an inferred intent and corresponding intent probability associated with the natural language query are determined. An inferred intent and corresponding probability can be determined by inputting the intent keyword and the corresponding intent attribute into a plurality of intent inference models that infer intent. As described, each of the intent inference models can correspond with a particular intent in the intent table corresponding with a dataset. At block 710, the inferred intent and corresponding intent probability are used to identify a data visualization to recommend in association with the dataset.

With reference now to FIG. 8, method 800 of FIG. 8 is directed to another example implementation of facilitating data visualizations based on a natural language query, in accordance with embodiments of the present technology. At block 802, dataset intent data, visual design intent data, and insight intent data determined from a user input natural language query are obtained. Such data may include candidate intent sets, such as intent keywords and intent attributes. At block 804, a set of candidate intent recommendations are generated using various combinations of the dataset intent data, visual design intent data, and insight intent data. Each of the candidate intent recommendations are incorporated or bound into a set of visualization templates to determine eligibility of the candidate intent recommendations, as indicated at block 806. At block 808, a determination is made as to whether the candidate intent recommendation is eligible to generate a visualization via the visualization template. In this regard, it is determined whether the data corresponds with a visualization template in a manner that can enable rendering of the corresponding visualization. If not, the method ends for that candidate intent recommendation and the candidate intent recommendation may be removed from further consideration, as indicated at block 810. On the other hand, for eligible candidate intent recommendations, a score associated with a corresponding visualization template is determined, as indicated at block 812. Such scores can be determined using weights for intent components (e.g., dataset intent data, visual design intent data, and insight intent data) indicating similarity to the natural language query and/or popularity. At block 814, based on the scores, at least one candidate intent recommendation and corresponding visualization template is selected to use as a visual recommendation for presenting a data visualization.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 9:
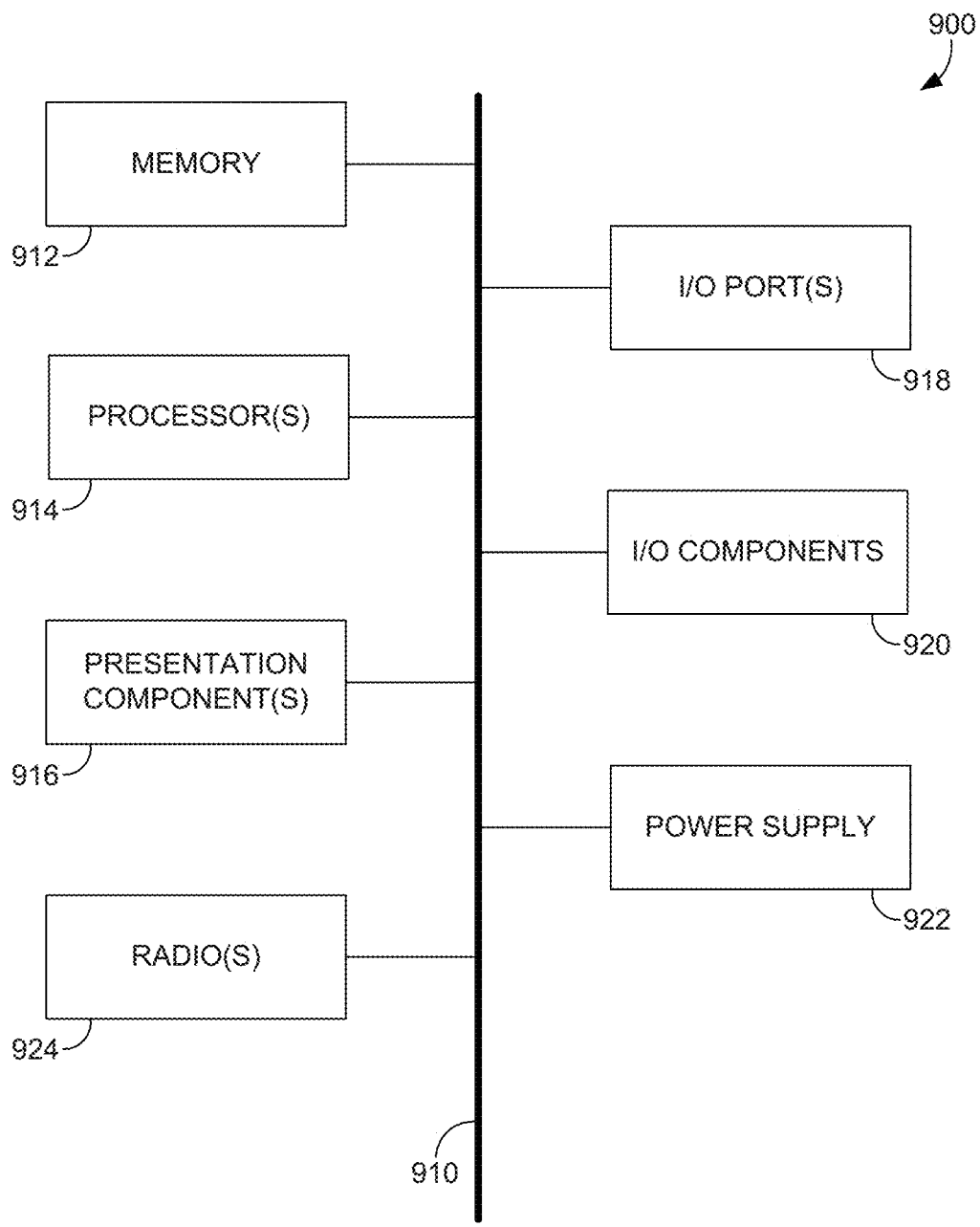
FIG. 9 is a block diagram of an exemplary computing environment suitable for use in implementing aspects of the technology described herein.

Referring to the drawings in general, and initially to FIG. 9 in particular, an exemplary operating environment for implementing aspects of the technology described herein is shown and designated generally as computing device 900. Computing device 900 is just one example of a suitable computing environment and is not intended to suggest any limitation as to the scope of use or functionality of the technology described herein. Neither should the computing device 900 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 9, computing device 900 includes a bus 910 that directly or indirectly couples the following devices: memory 912, one or more processors 914, one or more presentation components 916, input/output (I/O) ports 918, I/O components 920, an illustrative power supply 922, and a radio(s) 924. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 9 is merely illustrative of an exemplary computing device that can be used in connection with one or more aspects of the technology described herein. Distinction is not made between such categories as "workstation," "server," "laptop," and "handheld device," as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory 912 may be removable, non-removable, or a combination thereof. Exemplary memory includes solid-state memory, hard drives, and optical-disc drives. Computing device 900 includes one or more processors 914 that read data from various entities such as bus 910, memory 912, or I/O components 920. Presentation component(s) 916 present data indications to a user or other device. Exemplary presentation components 916 include a display device, speaker, printing component, and vibrating component. I/O port(s) 918 allow computing device 900 to be logically coupled to other devices including I/O components 920, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 914 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 900. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

A computing device may include radio(s) 924. The radio 924 transmits and receives radio communications. The computing device may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short"

and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. One or more computer storage media having computer-executable instructions embodied thereon that, when executed by one or more processors, cause the one or more processors to perform a method, the method comprising:
   identifying an intent keyword and a corresponding intent attribute from a user input natural language query;
   determining an inferred intent and corresponding intent probability associated with the natural language query by inputting the intent keyword and the corresponding intent attribute into a plurality of intent inference models that infer intent, wherein each of the intent inference models of the plurality of intent inference models corresponds with a particular intent of a set of predetermined intents corresponding with a dataset, wherein at least a first intent inference model of the plurality of intent inference models, based on the natural language query, infers a visual design intent for one or more attributes for presenting the dataset as a data visualization;
   selecting a visualization template from a set of visualization templates based at least in part on the visual design intent;
   generating a candidate intent recommendation that recommends the visualization template, wherein the candidate intent recommendation includes dataset intent data, visual design intent data, and insight intent data and at least one of the data intent data, visual design intent data, and insight intent data corresponds with the inferred intent;
   determining a score for the candidate intent recommendation associated with the visualization template using intent probabilities and/or popularity probabilities associated with each of the dataset intent data, visual design intent data, and insight intent data of the candidate intent recommendation; and
   providing, for display, a visual recommendation including the visualization template and at least a portion of the dataset intent data, visual design intent data, and insight intent data.

2. The media of claim 1, wherein the intent keyword and the corresponding intent attribute are identified using a keyword lexicon, a regular expression, and/or a grammar rule.

3. The media of claim 1, wherein a first portion of the plurality of intent inference models infer dataset intent, a second portion of the plurality of intent inference models infer the visual design intent, and a third portion of the plurality of intent inference models infer insight intent.

4. The media of claim 1, wherein the set of predetermined intents are generated based on analysis of the dataset and a set of visualization templates.

5. The media of claim 1, wherein for each of the dataset intent data, the visual design intent data, and the insight intent data, selecting a greater of an intent probability or a popularity probability corresponding therewith.

6. The media of claim 1 further comprising incorporating the dataset intent data, visual design intent data, and insight intent data, or a portion thereof, into a set of visualization templates to determine eligibility for each of the visualization templates of the set of visualization templates.

7. The media of claim 1, wherein the visualization template is selected from a set of visualization templates obtained by a plurality of visualization template contributors.

8. The media of claim 1, wherein at least one of the data intent data, visual design intent data, and insight intent data of the candidate intent recommendation is determined based on a missing value.

9. The media of claim 1, wherein the score for the candidate intent recommendation associated with the visualization template is determined based on a summation of weighted components corresponding with each of the dataset intent data, visual design intent data, and insight intent data.

10. The media of claim 1, wherein for each dataset intent data, visual design intent data, and insight intent data, a greater of a corresponding intent probability or a popularity probability is selected as a weight for use in determining the score.

11. A computer-implemented method comprising:
   identifying a plurality of candidate intent sets associated with a user input natural language query;
   identifying intent probabilities associated with the plurality of candidate intent sets using a set of intent inference models, wherein each of the intent inference models of the set of intent inference models corresponds with a particular intent of a set of predetermined intents corresponding with a dataset, wherein at least a first intent inference model of the set of intent inference models, based on the user input natural language query, infers a visual design intent for one or more attributes for presenting the dataset as a data visualization;
   selecting a visualization template from a set of visualization templates based at least in part on the visual design intent;
   generating a set of candidate intent recommendations that identify one or more visualization templates from the set of visualization templates, wherein each candidate intent recommendation of the set of candidate intent recommendations includes dataset intent data, visual design intent data, and insight intent data;
   for each candidate intent recommendation, determining a score using a corresponding intent probability or a popularity probability for each of the dataset intent data, visual design intent data, and insight intent data; and
   based on the scores, selecting a candidate intent recommendation associated with the visualization template to provide as a visual recommendation for presenting the data visualization of the dataset.

12. The method of claim 11, wherein each candidate intent set includes an intent attribute corresponding with a keyword intent.

13. The method of claim 11 further comprising generating the set of predetermined intents based on analysis of the dataset.

14. The method of claim 11, wherein the dataset intent data, visual design intent data, and insight intent data is determined by an intent identifier based on analysis of the user input natural language query and/or by a data visualization recommender based on missing or default data.

15. The method of claim 11, wherein the visual design intent data includes the popularity probability corresponding with the visualization template.

16. A computing system comprising:
a processor; and
computer storage memory having computer-executable instructions stored thereon which, when executed by the processor, configure the computing system to:
determine an inferred intent and corresponding intent probability associated with a user input natural language query by inputting an intent keyword and a corresponding intent attribute from the user input natural language query into a plurality of intent inference models that infer intent, wherein each intent inference model of the plurality of intent inference models corresponds with a particular intent of a set of predetermined intents corresponding with a dataset;
obtain dataset intent data, visual design intent data, and insight intent data determined from the user input natural language query, wherein the visual design intent data represents a visual design intent for one or more attributes for presenting the dataset as a data visualization, wherein at least one of the dataset intent data, the visual design intent data, and the insight intent data corresponds with the inferred intent, and at least a first intent inference model of the plurality of intent inference models, based on the user input natural language query, infers the visual design intent;
generate a set of candidate intent recommendations that identify one or more visualization templates from a set of visualization templates, using various combinations of the dataset intent data, the visual design intent data, and the insight intent data;
determine eligibility of candidate intent recommendations from the set of candidate intent recommendations by incorporating each of the candidate intent recommendations into the set of visualization templates;
for eligible candidate intent recommendations, determine a score associated with a corresponding visualization template; and
based on the scores, select at least one candidate intent recommendation and corresponding visualizations template to use as a visual recommendation for presenting the data visualization.

17. The system of claim 16, wherein the one or more visualization templates from the set of visualization templates are provided by a plurality of template contributors.

18. The system of claim 16, wherein eligibility is determined based on whether the data visualization can be rendered given the dataset intent data, visual design intent data, and insight intent data.

19. The system of claim 16, wherein the score associated with the corresponding visualization template is determined based on weighted values associated with each of the dataset intent data, the visual design intent data, and the insight intent data.

20. The system of claim 19, wherein the weighted values are weighted using intent probabilities or popularity probabilities.

* * * * *